US008176120B2

(12) United States Patent
Rosenstein et al.

(10) Patent No.: US 8,176,120 B2
(45) Date of Patent: *May 8, 2012

(54) WEB-PAGE AUTHORING TOOL FOR AUTOMATIC ENROLLMENT IN ADVERTISING PROGRAM

(75) Inventors: Justin M. Rosenstein, Oakland, CA (US); Amin Zoufonoun, San Jose, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/953,364

(22) Filed: Nov. 23, 2010

(65) Prior Publication Data

US 2011/0161178 A1 Jun. 30, 2011

Related U.S. Application Data

(63) Continuation of application No. 11/172,765, filed on Jun. 30, 2005, now Pat. No. 7,840,648, which is a continuation-in-part of application No. 11/118,045, filed on Apr. 29, 2005, now Pat. No. 7,536,641.

(51) Int. Cl.
*G06F 15/16* (2006.01)
*G06F 15/173* (2006.01)
*G06F 17/00* (2006.01)
*G06F 3/00* (2006.01)
*G06F 3/048* (2006.01)

(52) U.S. Cl. ........ 709/203; 709/217; 709/218; 709/219; 709/234; 709/243; 715/234; 715/243; 715/705; 715/760; 715/762

(58) Field of Classification Search .................. 709/203, 709/217–219, 234, 243; 715/234, 243, 705, 715/760, 762
See application file for complete search history.

(56) References Cited

U.S. PATENT DOCUMENTS

| 5,732,219 | A  | * | 3/1998  | Blumer et al. ................. 709/227 |
| 5,793,966 | A  | * | 8/1998  | Amstein et al. ............... 709/203 |
| 6,178,432 | B1 |   | 1/2001  | Cook et al. |
| 6,275,833 | B1 | * | 8/2001  | Nakamura et al. ............ 715/234 |
| 6,421,717 | B1 |   | 7/2002  | Kloba et al. .................. 709/219 |
| 6,868,426 | B1 |   | 3/2005  | Mankoff ..................... 707/104.1 |
| 6,976,003 | B1 |   | 12/2005 | Hamor et al. ................... 705/14 |
| 6,980,962 | B1 |   | 12/2005 | Arganbright et al. ........... 705/26 |
| 7,152,207 | B1 |   | 12/2006 | Underwood et al. ......... 715/526 |

(Continued)

OTHER PUBLICATIONS

Pelletier, *Zwiki Online Collaboration Tool*, ZopeMag.com, Product Reviews, Mar. 28, 2002, pp. 1-3.

(Continued)

*Primary Examiner* — Tonia L Dollinger
*Assistant Examiner* — Clarence John
(74) *Attorney, Agent, or Firm* — Morgan, Lewis & Bockius LLP

(57) ABSTRACT

A method of composing a web page is described. The method includes transmitting an authoring web page including an embedded authoring tool to a client computer using a network. The authoring tool may be used to compose the web page. Web-page content corresponding to the composed web page is received from the client computer. The composed web page may include one or more regions for displaying one or more advertisements having one or more links to one or more content locations. In another aspect of the disclosure, an advertising program registration module may include a link or other mechanism for sending the authoring web page to a publisher registering to participate in the advertising program.

57 Claims, 22 Drawing Sheets

U.S. PATENT DOCUMENTS

| | | | |
|---|---|---|---|
| 7,158,942 B2 | 1/2007 | Miyazaki et al. | 705/14 |
| 7,194,678 B1* | 3/2007 | Koike et al. | 715/234 |
| 7,240,025 B2 | 7/2007 | Stone et al. | 705/26 |
| 7,249,059 B2 | 7/2007 | Dean et al. | 705/26 |
| 7,266,512 B2 | 9/2007 | Cohn et al. | 705/26 |
| 7,356,559 B1 | 4/2008 | Jacobs et al. | 709/203 |
| 7,421,649 B1 | 9/2008 | Williams | |
| 7,437,317 B1 | 10/2008 | Xia et al. | 705/27 |
| 7,458,021 B2 | 11/2008 | Balasubramanyan et al. | 715/235 |
| 7,461,340 B1 | 12/2008 | Mauceri, Jr. et al. | |
| 7,536,641 B2 | 5/2009 | Rosenstein et al. | |
| 7,840,648 B1* | 11/2010 | Rosenstein et al. | 709/218 |
| 2002/0138562 A1 | 9/2002 | Wies et al. | |
| 2002/0194194 A1* | 12/2002 | Fenton et al. | 707/104.1 |
| 2003/0135765 A1 | 7/2003 | Hind et al. | 713/202 |
| 2003/0233425 A1 | 12/2003 | Lyons et al. | 709/217 |
| 2004/0003031 A1* | 1/2004 | Brown et al. | 709/203 |
| 2004/0044650 A1 | 3/2004 | Bova | 707/1 |
| 2004/0243930 A1 | 12/2004 | Schowtka et al. | 715/513 |
| 2005/0246283 A1 | 11/2005 | Gwiazda et al. | 705/52 |
| 2006/0004703 A1 | 1/2006 | Spivack et al. | 707/2 |
| 2006/0053194 A1 | 3/2006 | Schneider et al. | 709/204 |
| 2006/0123127 A1 | 6/2006 | Littlefield | 709/229 |
| 2006/0156216 A1 | 7/2006 | Chen et al. | |
| 2006/0235984 A1 | 10/2006 | Kraus et al. | 709/228 |
| 2006/0294187 A1* | 12/2006 | Hakel et al. | 709/206 |
| 2007/0226613 A1* | 9/2007 | Tandriono et al. | 715/530 |

OTHER PUBLICATIONS

Perez, J.C., "Macromedia Introduces Publishing Tool for EBay—Special Version of Contibute Web software will simplify creation of EBay stores," PC World.com, http://www.pcworld.com/resource/printable/article/0,aid,118422,00.asp, Nov. 1, 2004, 2 pages.

"Drupal.org—Community Plumbing: Drupal 4.6.3 / 4.5.5 released," http://drupal.org, last review dated Aug. 14, 2005, 6 pages.

"Homestead Quicksites," Demo@15!, Scottsdale, Arizona, Feb. 13-15, 2005, 2 pages.

"Bigstep: Test Drive Bigstep," Oct. 18, 2005, 9 pgs.

"Blogger: Create your Blog," Oct. 19, 2005, 6 pages.

"Confluence—the Enterprise Wiki and Features tour," Oct. 19, 2005, 51 pages.

"EditMe—Edit Your Web and Features," Oct. 19, 2005, 6 pages.

"Ephox EditLive! for Java 5.0—Highlights, What's New & Business User Productivity," Oct. 19, 2005, 12 pages.

"Jotspot—The Application Wiki, Intro and Advanced Tours," Oct. 19, 2005, 26 pages.

"Product Showcase—Sitemaker," Oct. 26, 2005, 2 pages.

"Squarespace—What is Squarespace," Oct. 19, 2005, 11 pages.

Trellix: Comprehensive Private-label Web Site Solutions, Oct. 18, 2005, 7 pages.

"TypePad Personal Weblogging Service," Oct. 19, 2005, 3 pages.

"UserLand ManilaSites—Introduction and User Guide," Oct. 19, 2005, 108 pages.

"Website Builder for Website Building—Moonfruit Sitemaker," Oct. 18, 2005, 6 pages.

"Website.Machine—Browser Based Software," Oct. 19, 2005, 3 pages.

"WordPress—Free Blog Tool and Weblog Platform and Features," Oct. 19, 2005, 4 pages.

"Yahoo! PageWizards," Oct. 18, 2005, 2 pages.

"Yahoo! SiteBuilder," Oct. 18, 2005, 2 pages.

Flexwiki, User Guide, Oct. 19, 2005, 2 pgs. www.flexwiki.com/default.aspx/flexwiki/userguide.html.

"Homestead, SiteBuilderLPX, Feature Review—New and Improved Functionality", 2005, 3 pgs,.http://www.homestead.com/~site/Documents/lpx_product_review.pdf.

TWiki,, "TWiki™—an Enterprise Collaboration Platform," Oct. 19, 2005, 5 pgs. http://www.twiki.org.

* cited by examiner

― 1170

Campus Café's Homepage

Topics:

☐ Link 1

☐ Link 2

☐ Link 3

Welcome to this page. Below is this week's menu (03/07/05-03/11/05):

| Mon. | Chinese |
| --- | --- |
| Tue. | Italian |
| Wed. | French |
| Thu. | Mexican |
| Fri. | American |

For directions, please click this link.

You are the 0123 visitor since 01/01/04.

Figure 11I

WEB-PAGE AUTHORING TOOL FOR AUTOMATIC ENROLLMENT IN ADVERTISING PROGRAM

RELATED APPLICATIONS

This application is a continuation of U.S. patent application Ser. No. 11/172,765, filed Jun. 30, 2005, entitled "Web-Page Authoring Tool for Automatic Enrollment in Advertising Program," now U.S. Pat. No. 7,840,648, issued Nov. 23, 2010, which is continuation-in-part of U.S. patent application Ser. No. 11/118,045, filed Apr. 29, 2005 now U.S. Pat. No. 7,536,641, "Web Page Authoring Tool for Structured Documents," which are hereby incorporated by reference in their entirety.

The present application is also related to U.S. patent application Ser. No. 11/172,669, filed Jun. 30, 2005, entitled "Online Advertising Enrollment Program," which is hereby incorporated by reference in its entirety.

FIELD OF THE INVENTION

The present invention relates generally to advertising programs, and more specifically to a web-page authoring tool used during enrollment in an advertising program.

BACKGROUND

Advertising on the Internet or World Wide Web (WWW) has become a large source of revenue for companies. A subset of such Internet advertising includes providing incentives to publishers to include advertising, such as links to other document or content locations, on their web pages. The links may include one or more uniform resource locators or URLs. If a visitor to a respective web page that includes such advertising activates one or more of these links, a publisher of the respective web page may receive a financial reward.

Such incentives may lead to an increase in interest in participating in such joint advertising programs. However, many individuals may be unable to do so because they currently do not have a web page in which to embed such advertising. As a consequence, there is an need for a web-page authoring tool for use during enrollment in such advertising programs.

SUMMARY

A method of composing a web page includes transmitting an authoring web page including an embedded authoring tool to a client computer using a network. The authoring tool may be used to compose the web page. Web-page content corresponding to the composed web page is received from the client computer. The composed web page may include one or more regions for displaying one or more advertisements having one or more links to one or more content locations. Some embodiments are implemented as a computer program product for use in conjunction with a computer system. The computer program product includes a computer readable storage medium that stores one or more programs for execution by one or more processors on the computer system.

An advertising program registration module may include a link or other mechanism for sending the authoring web page to a publisher registering to participate in the advertising program.

The authoring tool may include instructions for placing one or more instances of predefined structured fields in the composed web page, and for associating user-specified content within the one or more instances of the predefined structured fields. The authoring tool may include instructions for modifying the authoring web page to include a replica of the composed web page.

The web-page content may include one or more instances of predefined structured fields in the composed web page and associated user-specified content within the one or more instances of the predefined structured fields.

The advertisements may be based on run-time content of the composed web page. The advertisements may be based on context terms, provided by a publisher of the composed web page, that summarize the web-page content.

A financial incentive to a publisher of the composed web page may be provided whenever a visitor to the composed web page activates one of the links associated with the one or more advertisements.

In some embodiments, the method may include receiving financial information from the publisher. The financial information may include a name, an address, a telephone number and a social security number.

In some embodiments, the method may include creating an account for a publisher of the composed web page and/or accessing an existing account for the publisher of the composed web page.

In some embodiments, the method may include dynamically generating hypertext markup language (HTML) using the web-page content. The HTML may correspond to the composed web page.

In some embodiments, the method may include saving the web-page content. A latest version of the web-page content may be received a plurality of times that are separated by a minimum predefined time interval.

In an alternate embodiment, a data stream including an authoring web page having an embedded authoring tool is received using the network. The authoring tool may be used for composing the web page. Web-page content corresponding to the composed web page is transmitted. The composed web page may include one or more regions for displaying one or more advertisements having one or more links to one or more content locations.

BRIEF DESCRIPTION OF THE DRAWINGS

For a better understanding of the invention, reference should be made to the following detailed description taken in conjunction with the accompanying drawings, in which:

FIGS. 11A-11J are a set of schematic screenshots illustrating embodiments of a web page composed by a web-page author through a browser window using a web-page editor in a what-you-see-is-what-you-get (WYSIWYG) manner.

Like reference numerals refer to corresponding parts throughout the drawings.

DETAILED DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Embedded advertising in documents, such as web pages and or web sites, on an Intranet and/or the Internet, which is also referred to as the World Wide Web (WWW), can be lucrative to publishers of such documents. Many joint advertising programs, such as Google AdSense offered by Google, reward a respective publisher when one or more links to other content locations, such as uniform resource locators or URLs, that are included in the advertising, are activated by visitors to a respective document. In order to assist many individuals who do not currently have a web page or web site participating in such joint advertising programs, an improved registration process is described.

In the improved registration process, a document, such as a web page or a web site, may be created for a user that is interested in the joint advertising program but does not currently have such a document. In one embodiment, a document, henceforth called a composed web page, is created for the user based on information the user has provided during the registration process. In another embodiment, a plurality of composed web pages having different formats are created for the user and the user selects a preferred format. In another embodiment, the user is provided with an authoring tool for creating content corresponding to a desired or composed web page. The authoring tool may be embedded in a web page transmitted to the user. In each of these embodiments, the composed web page includes one or more regions for displaying one or more advertisements having one or more links to one or more content locations.

It is noted that a web page is a document designed for viewing in a browser, such as a web browser, regardless of whether the document is accessed via the Internet, an intranet, or other mechanism.

A "window" or "browser window" comprises a virtual graphical display area for viewing a web page, HTML file, XML file or the like. A "window" typically corresponds to a "tab" or "window" or the like in various browser programs.

The term "HTML file" is used here to mean a file, object or the like that represents a web page and is suitable for rendering by a browser or other client application.

Figure 1:
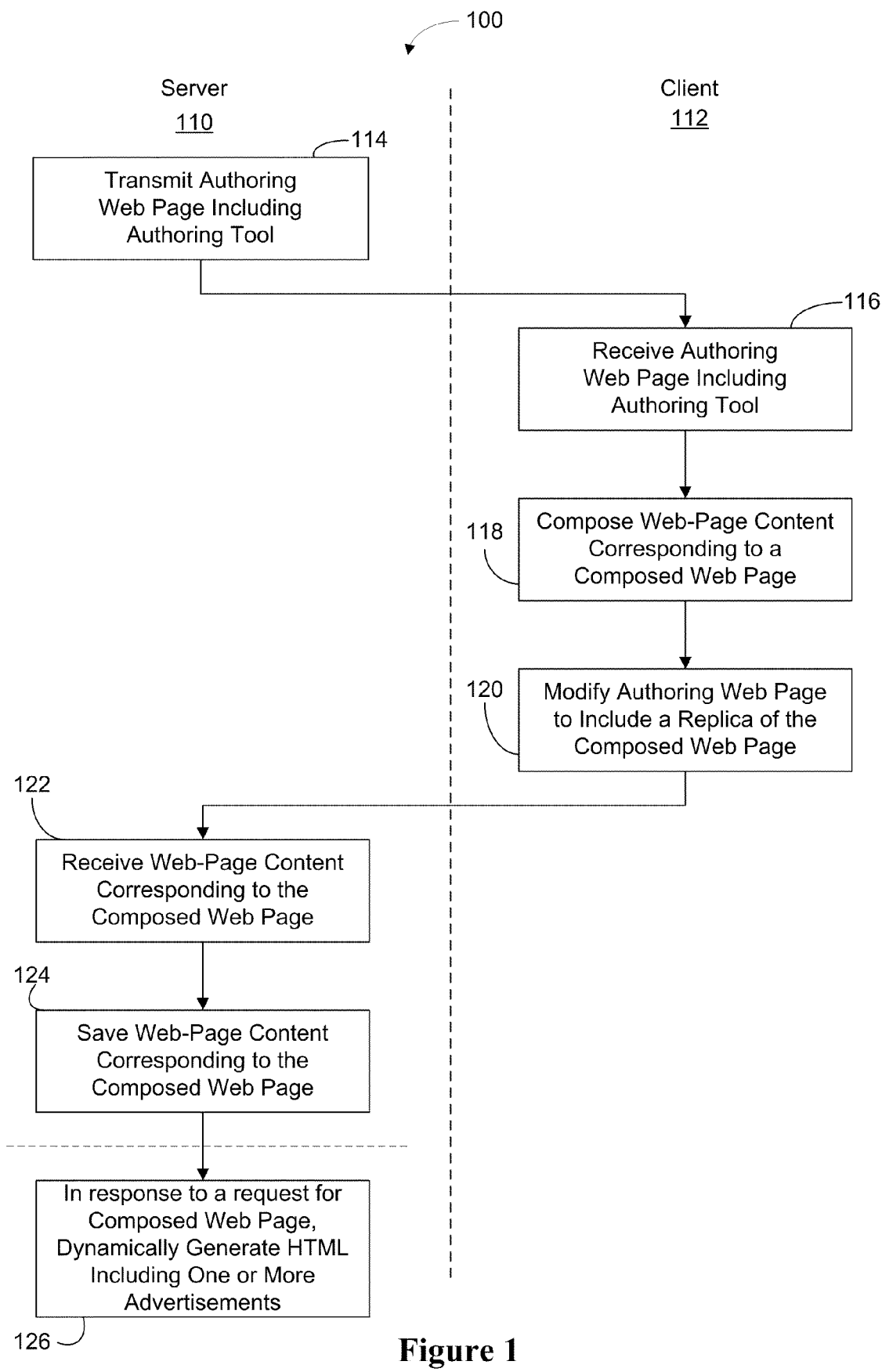
FIG. 1 is a flow diagram illustrating an embodiment of interaction between a client and a server.

FIG. 1 is a flow diagram illustrating an embodiment 100 of web-page authoring method that includes interaction between a server 110 and a client 112. An authoring web page including an authoring tool is transmitted (114). The authoring web page including the authoring tool is received (116). Web-page content corresponding to a composed web page is composed (118) by a user of the client 112, using the authoring tool. The authoring web page may be modified to include a replica of the composed web page (120) during the authoring process. For instance, as the user adds structured fields an objects to the composed web page, the authoring web page may be updated so that the user immediately (or virtually immediately) sees a replica of the current version of the composed web page.

The composed web page may include a region set aside for displaying one or more advertisements. The inclusion of an advertisement region in the composed web page may be accomplished by the user selecting a "tool" in the authoring web page for adding the advertisement region. Alternately, the inclusion of the advertisement region in the composed web page may be accomplished automatically, by including a corresponding parameter in the initial URL used to invoke the authoring web page. In particular, when a publisher (e.g., person or company) registers for a joint advertising program, the published may be asked whether they would like to compose a new web page to be used in the joint advertising program. If the user elects this option, the user is presented with an authoring web page in which an advertising region is already included in the web page to be composed. The advertising region may be automatically configured to include one or more parameters that identify the publisher, thereby facilitating the publisher's participation in the joint advertising program.

Web-page content corresponding to the composed web page is received (122) and saved (124) at the server 110. After the composed web page is enabled for publication, and the server receives a request (e.g., from a client) for a copy of the composed web page, the server responds to the request by dynamically generating a hypertext markup language (HTML) file corresponding to the composed web page. The composed web page (i.e., the HTML file), as rendered by the requesting client, includes one or more advertisements (126). In some embodiments, the generation of the HTML file for the composed web page and the generation of the advertisements can be performed by different servers. In particular, a web page server may generate the HTML file for the composed web page. The HTML file may include one or more scripts (e.g., JavaScript instructions) that, when executed by the client computer receiving the HTML file for the composed web page, accesses an advertising server, which sends one or more advertisements for inclusion in the composed web page. In other embodiments, the web-page authoring method may include fewer operations or additional operations. In addition, two or more operations may be combined and/or the order of the operations may be changed.

Figure 2:
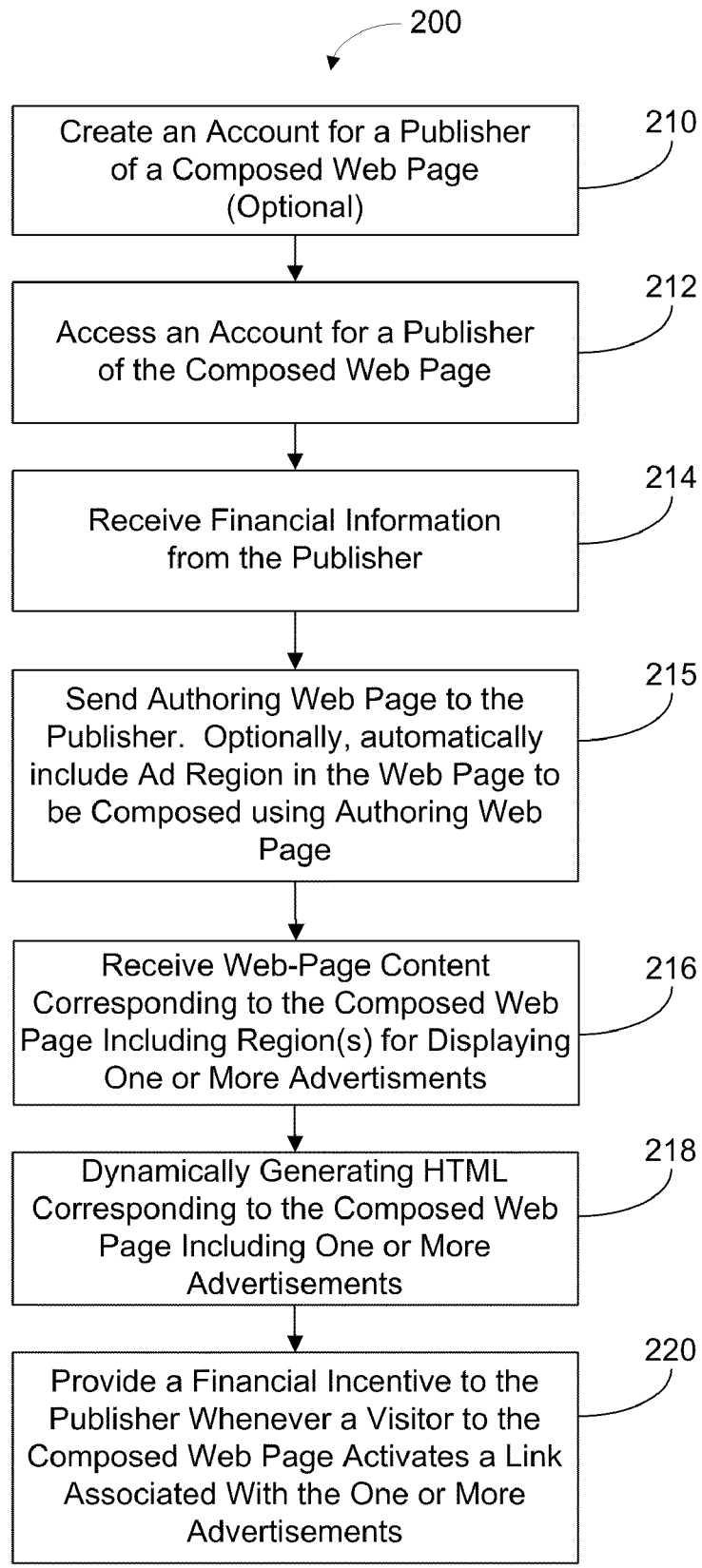
FIG. 2 is a flow diagram illustrating an embodiment of a method of enrolling a web page publisher in an advertising program.

There are a variety of approaches for creating the partner web page during an enrollment or registration process. FIG. 2 is a flow diagram illustrating an embodiment of a method of enrolling a web-page publisher in an advertising program 200, sometimes herein called a joint advertising program because the web-page publisher participates in the program jointly with the advertisers. An account for a publisher of a composed web page is optionally created (210). Importantly, operation 210 may be performed before the publisher has created any web pages that will participate in the joint advertising program. Typically, the account will be assigned a unique identifier that the publisher must use when composing web pages that will participate in the joint advertising program. The account for the publisher of a composed web page is accessed (212). Financial information is received from the publisher (214). Financial information may include a name, an address, a telephone number, financial institution or account information (e.g., for depositing funds earned by the publisher by participating in the joint advertising program) and/or a social security number or other identifying information. In some embodiments, the enrollment or registration process 200 is implemented in software (herein called a registration module 526, FIG. 5) executed at a website, or embedded in one or more web pages. The registration software may include an option for helping the publisher to participate in the joint advertising program by invoking an authoring web page to be displayed in a browser window on the publisher's computer (215). The authoring web page can then be used by the publisher to compose a web page that includes an advertising region. The advertising region is used to display advertisements from advertisers participating in the joint advertising program. As noted above in the discussion of FIG. 1, the inclusion of an advertisement region in the composed web page may be accomplished automatically, by including a corresponding parameter (e.g., "+AdRegion") in the initial URL used to invoke the authoring web page. In some embodiments, the advertising region itself is represented or defined by a script (e.g., JavaScript instructions, in the composed web page) that identifies the publisher. The script may also identify the size of the advertisement region in the composed web page, and may include other relevant parameters as well.

Web-page content corresponding to the composed web page including regions for displaying one or more advertisements is received (216). For instance, the web-page content may be received from client, where the client renders an authoring web page used by the publisher to compose the web page. Upon receiving a request (from a client computer or device) for the composed web page, the server responds by dynamically generating an HTML file corresponding to the composed web page, using the web-page content (218). The composed web page (i.e., the HTML file), as rendered by the requesting client, includes one or more advertisements (218). As noted above, the advertisements may be generated or retrieved from a different server than the server that dynamically generates the HTML for the requested web page. A financial incentive is provided to the publisher whenever a visitor to the composed web page activates a link associated with the one or more advertisements (220). The enrollment method may include fewer operations or additional operations. In addition, two or more operations may be combined and/or the order of the operations may be changed.

As discussed further below, the authoring tool embedded in the web page allows a partner in an advertising program to generate web-page content corresponding to a composed web page. The authoring tool may include instructions for placing one or more instances of predefined structured fields in the composed web page, and for associating user-specific content within one or more instances of the predefined structured fields. The one or more instances of predefined structured fields in the composed web page, and the user-specific content associated with one or more instances of the predefined structured fields may be included in the web-page content. The authoring tool instructions may be executable on a client computer, for example, within a browser defined environment (e.g., Firefox™, Safari™, Internet Explorer™, or others) or a standalone program that displays a structured document such as a web page. In some embodiments, the authoring tool is written in JavaScript™ (a trademark of Sun Microsystems, Inc.), ECMAScript (the specification for which is published by the European Computer Manufacturers Association International), or VBScript™ (a trademark of Microsoft, Inc.), or any other client-side scripting language; i.e., the authoring tool includes programs or procedures containing JavaScript, ECMAScript or VBScript instructions.

The authoring tool may also contain instructions for modifying the authoring web page in which it is embedded to include a replica of the composed web page. This feature may be useful during the authoring process. The web-page content may be transmitted to and stored on one or more servers. The server may dynamically generate HTML corresponding to the composed web page based on the web-page content. The replica of the composed web page may be incorporated into the authoring web page through the use of an "iframe" (also called an iframe tag) that contains a URL associated with a server 110. The URL in the iframe is used to download from the server an HTML file corresponding to the composed web page. In other embodiments, the authoring tool or other program on the client may compose the replica, in which case the iframe in the authoring page would contain a URI (uniform resource identifier) or URL that points to a locally generated HTML file or object corresponding to the composed web page.

Figure 3:
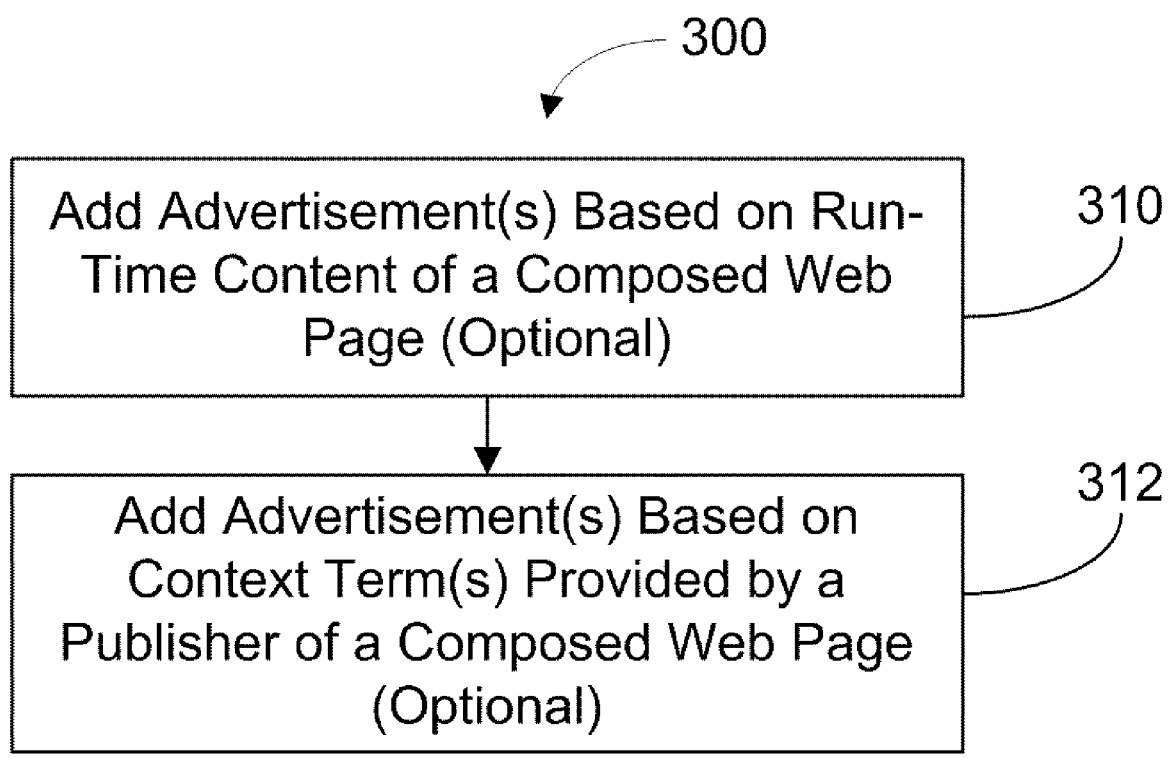
FIG. 3 is a flow diagram illustrating an embodiment of a method of including advertising in a document.

FIG. 3 is a flow diagram illustrating an embodiment of a method for including advertising in a document 300, such as the composed web page. One or more advertisements may be optionally added to the composed web page based on run-time content of the composed web page (310). One or more advertisements may be optionally added to the composed web page based on one or more context terms provided by a publisher of the composed web page (312). The context terms may summarize the content of the composed web-page. The method of including advertising in a document may include fewer operations or additional operations. In addition, two or more operations may be combined and/or the order of the operations may be changed.

Figure 4:
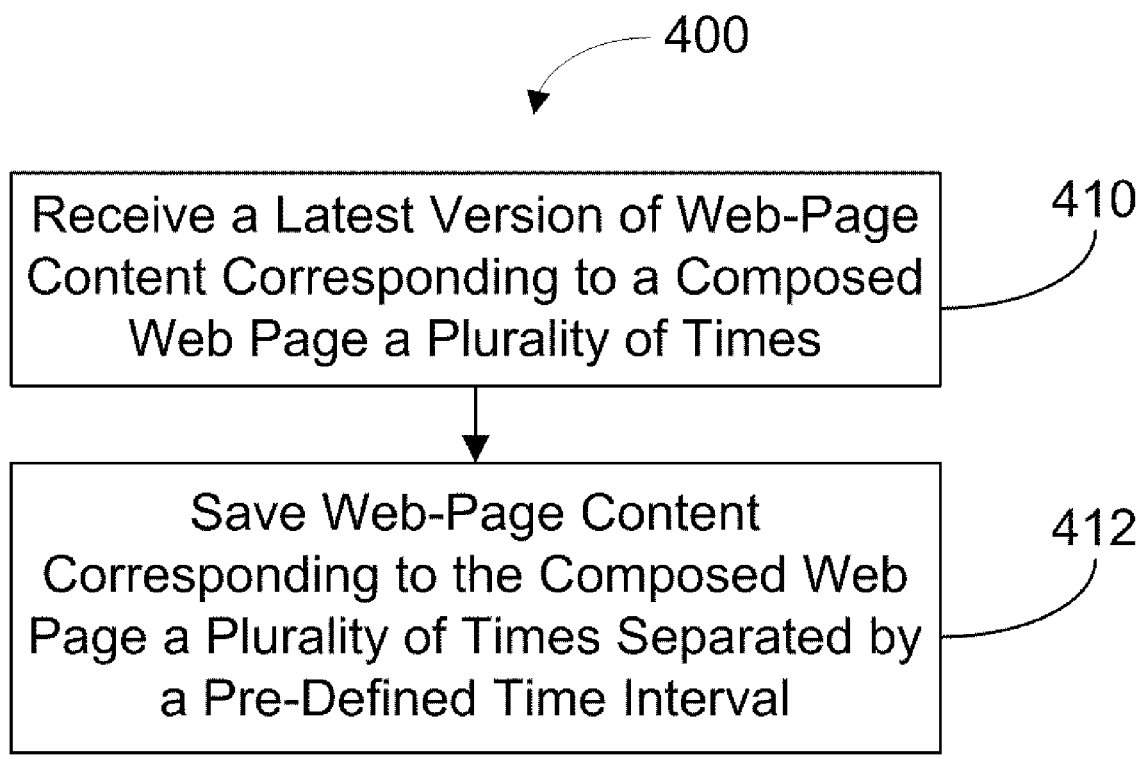
FIG. 4 is a flow diagram illustrating an embodiment of a method of storing web-page content.

FIG. 4 is a flow diagram illustrating an embodiment of a method of storing web-page content 400. As a user at the client continues to compose the web-page, the latest versions of the web-page content corresponding to the composed web page are received a plurality of times (410), for instance at predefined time intervals (e.g., every 5 to 30 seconds). The received web-page content corresponding to the composed web page is also saved at the predefined time intervals (412), such as every 5 to 30 seconds. However, new versions of the web-page content are received and saved at a server only when new content has been created at a client. The method of storing web-page content may include fewer operations or additional operations. In addition, two or more operations may be combined and/or the order of the operations may be changed.

Figure 5:
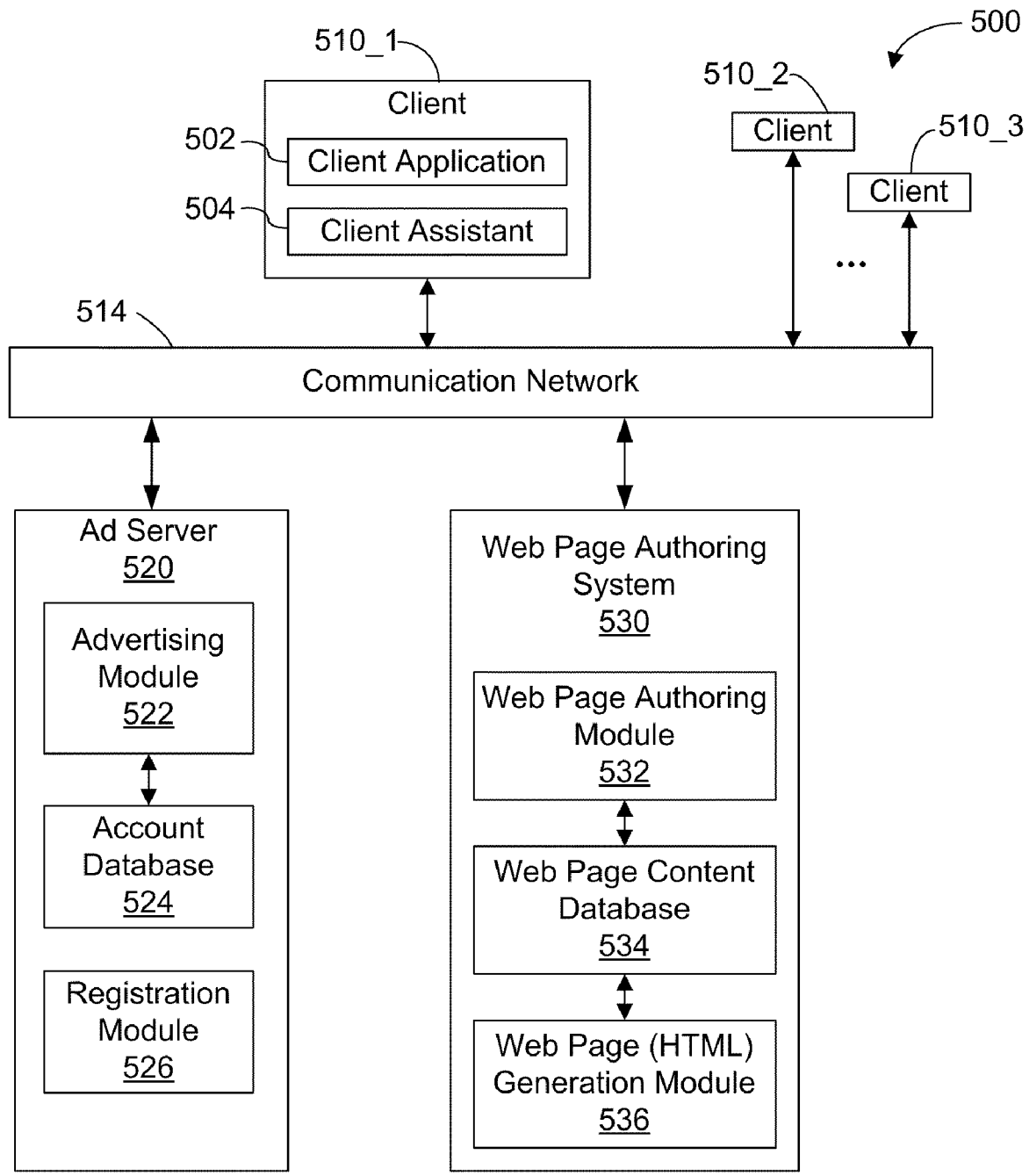
FIG. 5 is a block diagram illustrating an embodiment of a distributed system.

Attention is now given to hardware and systems that may utilize and/or implement the registration process for partners and the embodiments, such as embodiment 200, of methods of composing the composed web page discussed above. FIG. 5 illustrates an embodiment of a distributed system 500 that includes one or more clients 510, an advertisement server 520, a web page authoring system 530, and one or more communication networks 514 for interconnecting these systems and/or devices. Each client 510 may have a client application 502, such as a browser, and a client assistant 504, such as the authoring tool discussed elsewhere in this document. It should be appreciated that the layout of the system 500 is merely exemplary and may take on any other suitable layout or configuration.

Advertisement server 520 includes an advertising module 522 and an account database 524. The account database 524 may be used to store advertisements owned or sponsored by a plurality of advertisers (or to store the locations or URLs associated with the advertisements), bids by advertisers for inclusion of their advertisements in the web pages of participating web page publishers and/or search engine search results, account balances, and so on. The advertising module 522 may be used to determine which advertisements to serve when presented with a request by (or on behalf of) a participating web page publisher, or when presented with a set of query terms. For instance, the advertising module 522 may receive the content of a web page, identify one or more best matches between the web page content and a set of candidate advertisements, and then send the identified advertisements to a requesting computer or device for inclusion in the web page. In one embodiment, the advertisement server 520 implements the Google AdSense joint advertising program.

In some embodiments, advertisement server 520 further includes a registration module 526 for registering or enrolling advertisers and advertising program publishers. The registration module 526 includes programs or instructions for performing operations 210, 212, 214, and optionally 215 of the enrollment method shown in FIG. 2.

Figure 6:
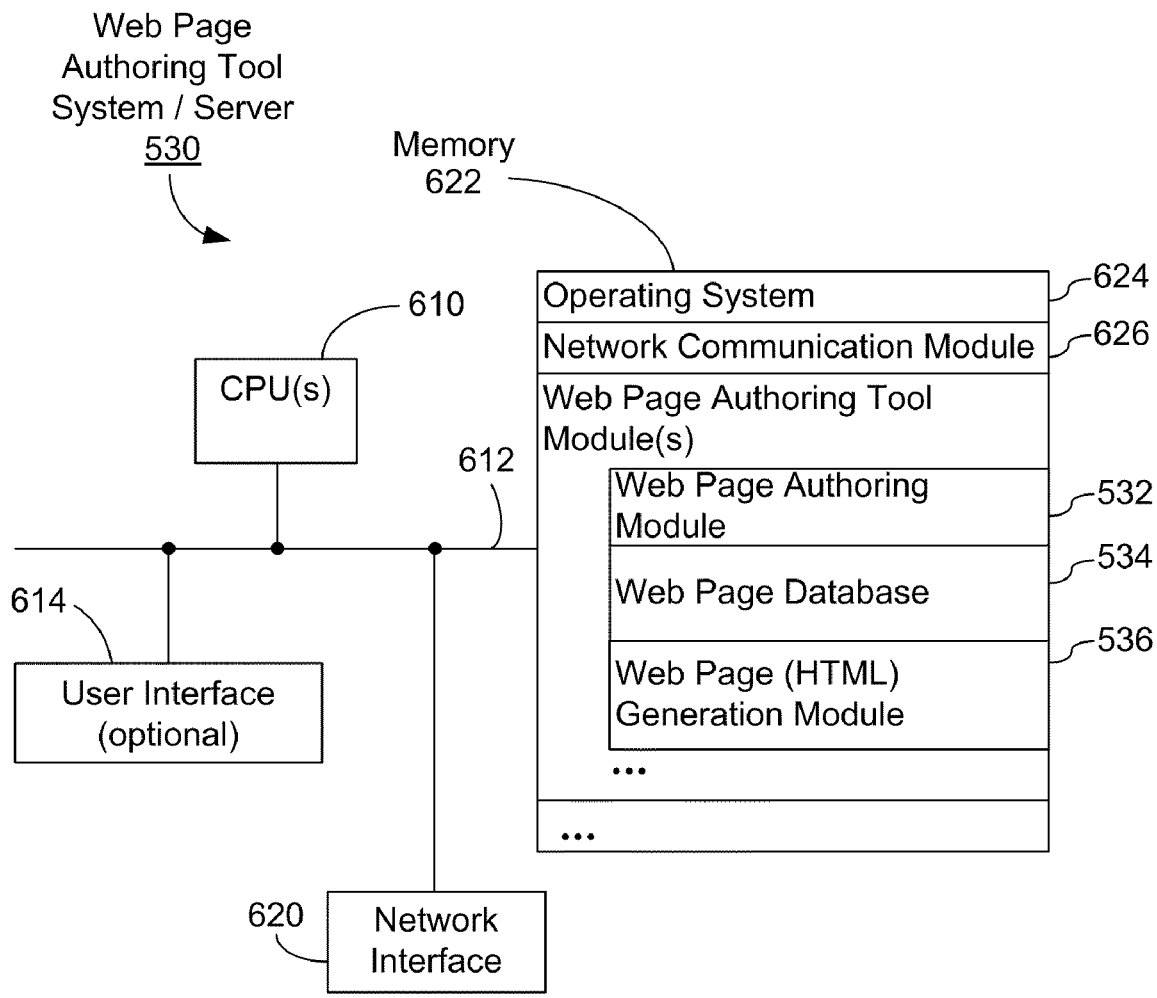
FIG. 6 is a block diagram illustrating an embodiment of a web page authoring system.

FIG. 6 is block diagram illustrating an embodiment of a web page authoring system 530. The system 530 may include at least one data processor or central processing unit (CPU) 610, one or more optional user interfaces 614, a communications or network interface 620 for communicating with other computers, servers and/or clients, a memory 622 and one or more signal lines or communication busses 612 for coupling these components to one another.

The memory 622 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 622 may optionally include one or more storage devices remotely located from the CPU(s) 610. Memory 622, or alternately the non-volatile memory device(s) within memory 622, comprises a computer readable storage medium. The memory 622, or the computer readable storage medium of memory 622, may store an operating system 624, such as LINUX, UNIX or WINDOWS, that includes procedures (or a set of instructions) for handling basic system services and for performing hardware dependent tasks. The memory 622, or the computer readable storage medium of memory 622, may also store communication procedures (or a set of instructions) in a network communication module 626. The communication procedures are used for communicating with clients, such as the clients 510 (FIG. 5), and with other servers and computers.

The memory 622, or the computer readable storage medium of memory 622, may also store the query server 516 (or a set of instructions) and the query processing controller 522 (or a set of instructions). The query server 516 may include the following elements, or a subset or superset of such elements: the client communication module 518, the query receipt, processing and response module 520 web-page authoring module 538, web-page content database 540, advertising module 542 and account database 544.

Although FIG. 6 shows system 530 as a number of discrete items, FIG. 6 is intended more as a functional description of the various features which may be present in a web page authoring system rather than as a structural schematic of the embodiments described herein. In practice, and as recognized by those of ordinary skill in the art, the functions of the system 530 may be distributed over a number of servers or computers, with various groups of the servers performing particular subsets of those functions. Items shown separately in FIG. 6 could be combined and some items could be separated. For example, some items shown separately in FIG. 6 could be implemented on single servers and single items could be implemented by one or more servers. The actual number of servers in a web page authoring system and how features, are allocated among them will vary from one implementation to another, and may depend in part on the amount of information stored by the system and/or the amount data traffic that the system must handle during peak usage periods as well as during average usage periods.

Figure 7:
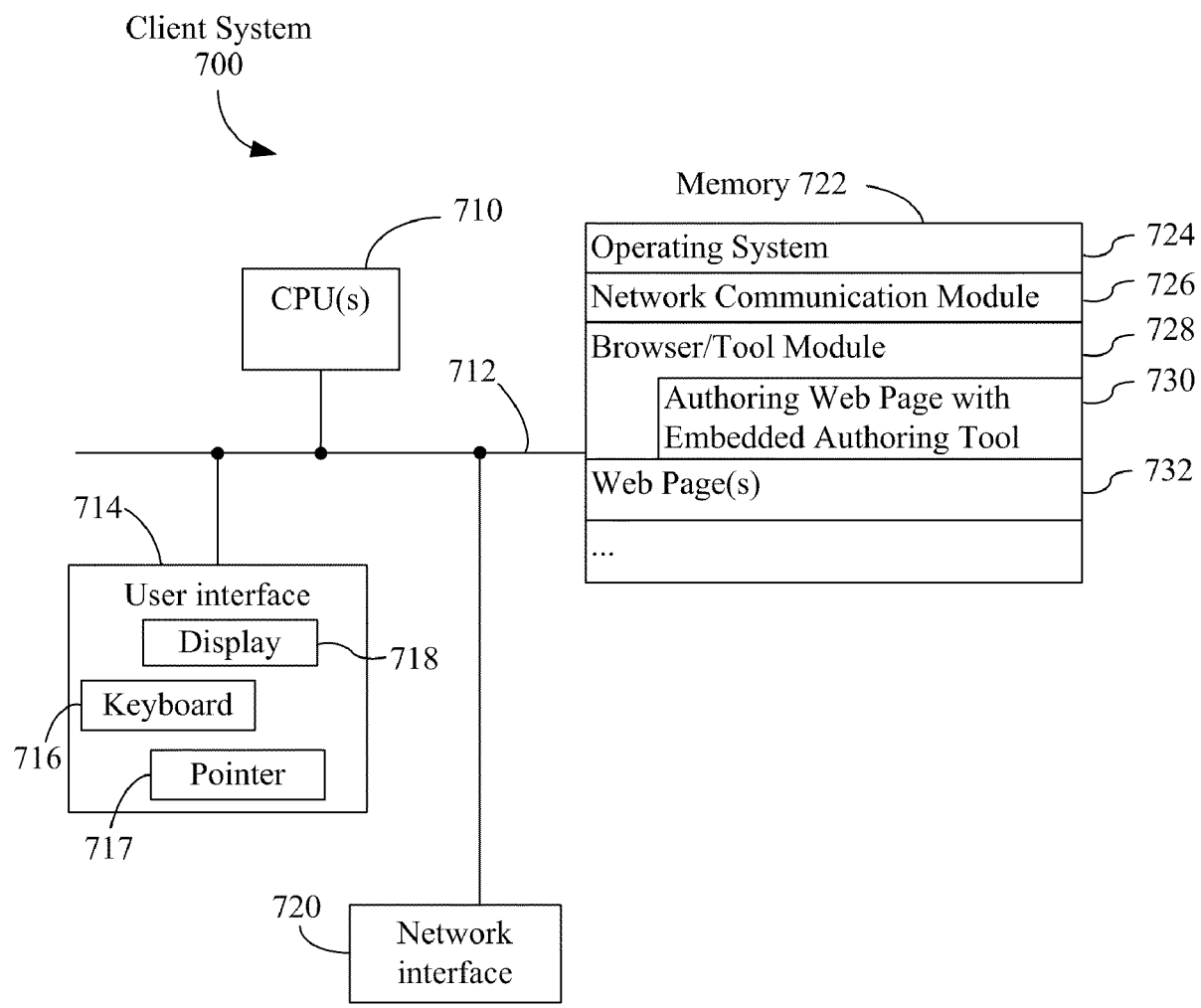
FIG. 7 is a block diagram illustrating an embodiment of a client system.

FIG. 7 illustrates a block diagram of an embodiment of a client system 700. The client system 700 may include at least one data processor or central processing unit (CPU) 710, one or more optional user interfaces 714, a communications or network interface 720 for communicating with other computers, servers and/or clients, a memory 722 and one or more signal lines 712 for coupling these components to one another. The user interface 714 may have one or more keyboards 716, a pointer device 717 such as mouse, trackball or touch sensitive pad, and/or one or more displays 718. The one or more signal lines 712 may constitute one or more communications busses.

The memory 722 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 722 may optionally include one or more storage devices remotely located from the CPU(s) 710. Memory 722, or alternately the non-volatile memory device(s) within memory 722, comprises a computer readable storage medium. The memory 722, or the computer readable storage medium of memory 722, may store an operating system 724, such as LINUX, UNIX or WINDOWS, that includes procedures (or a set of instructions) for handling basic system services and for performing hardware dependent tasks. The memory 722, or the computer readable storage medium or memory 722, may also store communication procedures (or a set of instructions) in a network communication module 726. The communication procedures are used for communicating with the web page authoring system 530 or any specified website or URL accessible to the client system 700.

The memory 722, or the computer readable storage medium of memory 722, may also include a browser or browser tool module 728 (or a set of instructions). The browser 728 may be used to render various web pages 730, 732, including a web page 730 having an embedded webpage authoring tool. As discussed elsewhere in this document, the web-page authoring tool may be embedded in one or more web pages received from a remote server and rendered by the browser or browser tool module 728. In some clients, the browser 728 may render web pages 732 authored using the authoring web page 730. Such web pages 732 may include advertisements when the web pages are composed by participants in a joint advertising program, such as the Google AdSense advertising program.

In embodiments where the client system 700 is coupled to a local server computer, one or more of the modules and/or applications in the memory 722 may be stored in a server computer at a different location than the user.

Each of the above identified modules and applications corresponds to a set of instructions for performing one or more functions described above. These modules (i.e., sets of instructions) need not be implemented as separate software programs, procedures or modules. The various modules and sub-modules may be rearranged and/or combined. The memory 722 may include additional modules and/or sub-modules, or fewer modules and/or sub-modules. The memory 722, therefore, may include a subset or a superset of the above identified modules and/or sub-modules.

Figure 8:
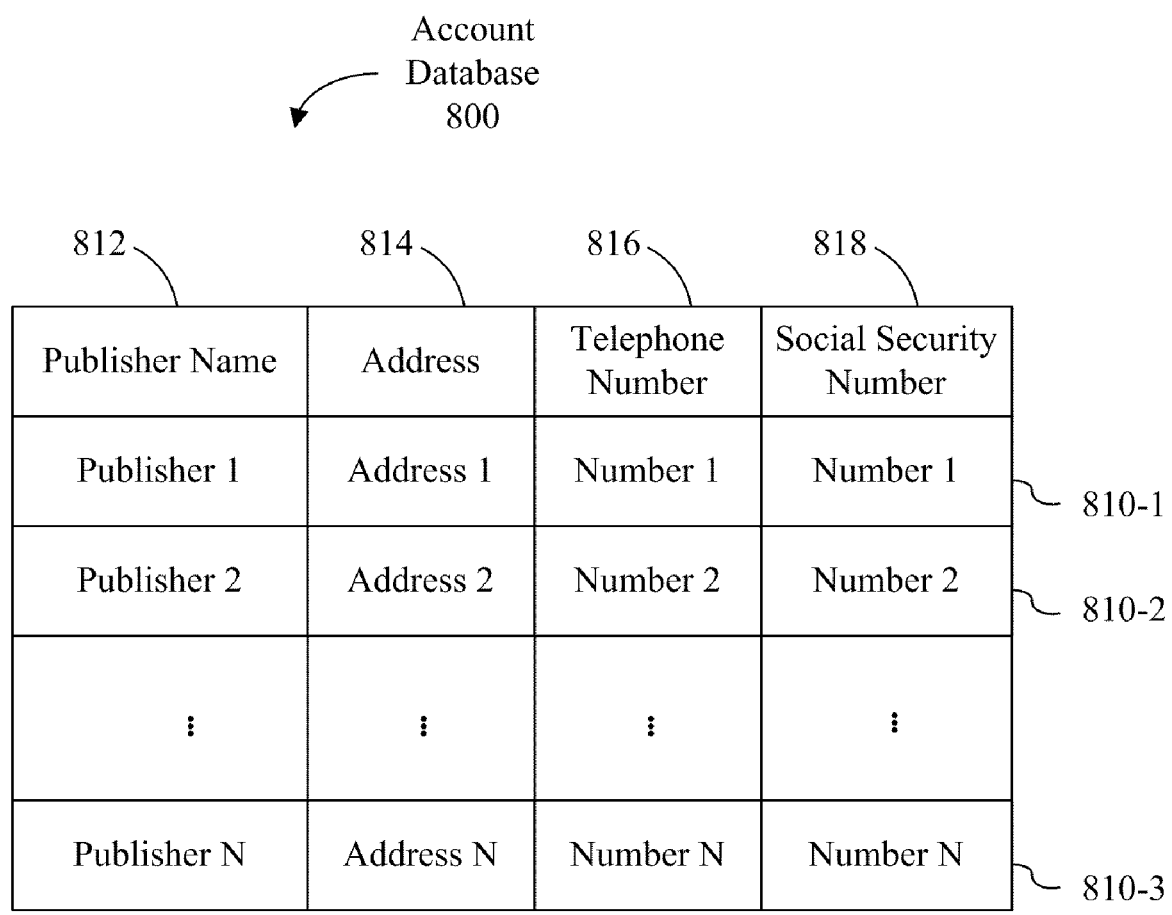
FIG. 8 is a block diagram illustrating an embodiment of an account database.

FIG. 8 is a block diagram illustrating an embodiment of an account database 800. The account database 800 may include multiple entries 810 for publisher names 812, publisher addresses 814, publisher telephone numbers 816 and publisher social security numbers 818.

Figure 9:
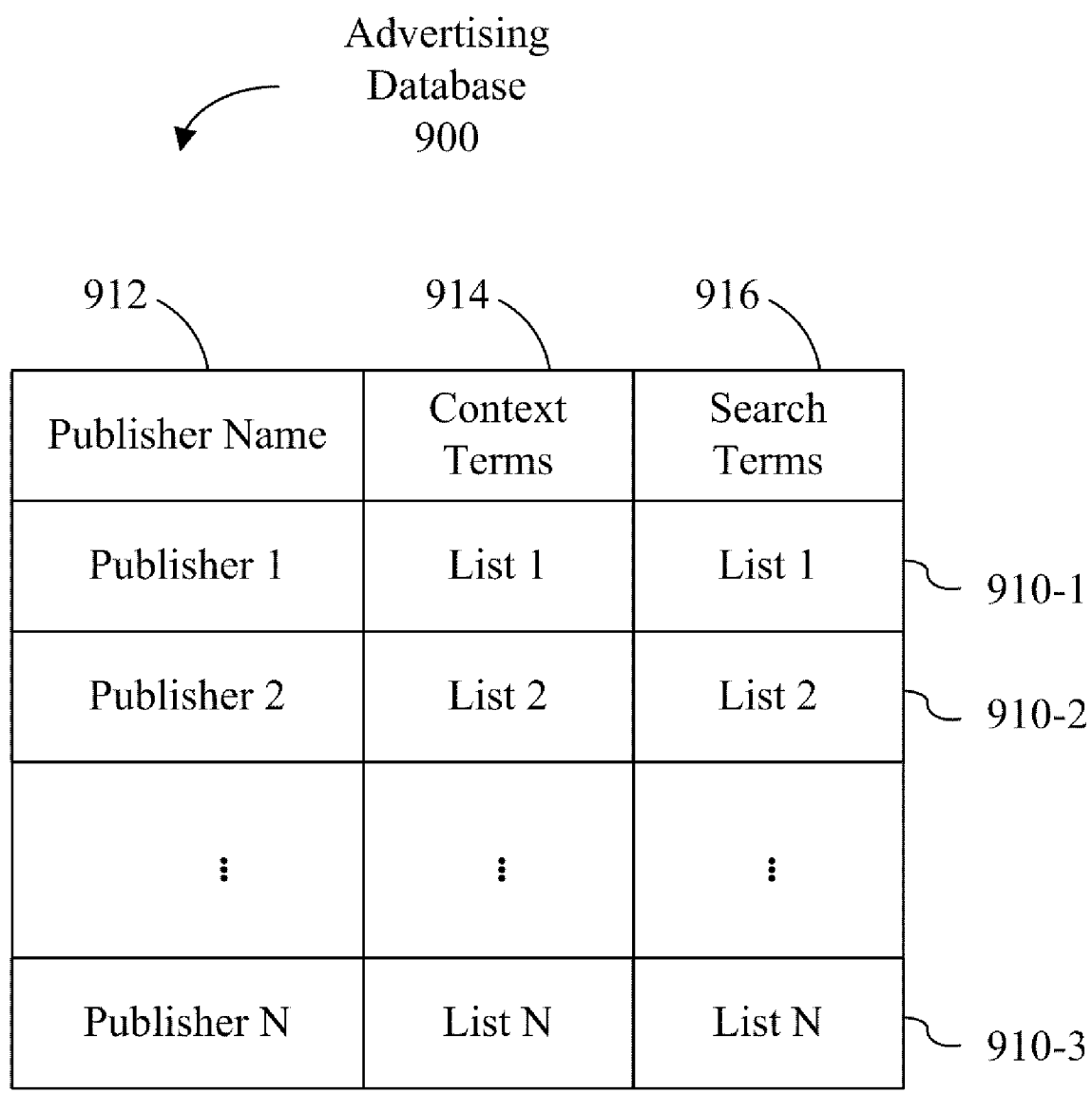
FIG. 9 is a block diagram illustrating an embodiment of an advertising database.

FIG. 9 is a block diagram illustrating an embodiment of an advertising database 900. The advertising database 900 may include multiple entries 910 for publisher names 912, context terms 914 and search terms 916. The context terms 914 may be used to determine appropriate advertising to include in a respective composed web page. The search terms 916 may be used to determine appropriate advertising to include in the respective web page based on a search query generated by a browser embedded in the composed web page.

Attention is now given to embodiments of the embedded authoring tool and related user interfaces. The authoring tools allows individuals to compose a web page having a desired look-and-feel without being very familiar with the HTML syntax. In addition, the embedded authoring tool allows individuals to create and edit web-page content in intuitive format that corresponds to how the web-page content will be rendered by a browser. In some embodiments, the embedded authoring tool includes instructions for a browser to generate a window including a web-page editing region that displays a web page under construction. The web-page editing region further includes one or more user-specified instances of structured fields, each instance responsible for hosting a portion of the web-page content entered directly by an individual (a web-page author) through the browser window and input/output (I/O) devices. Once published (e.g., on the Internet or an intranet), the web page corresponding to the web-page content may be displayed in a browser window in a style consistent with the user-entered web-page content in the web-page editing region.

The web-page authoring tool embedded in a web page is suitable for rending by a browser, and includes a web-site manager, a web page manager and a web-page editor. The web-page editor includes a plurality of modules enabling a web-page author to compose a web page directly through a web browser window in a what-you-see-is-what-you-get (WYSIWYG) manner.

In some embodiments, a client computer includes a web-page authoring tool enabling a web-page author to compose a web page directly through a browser window in a WYSIWYG manner. The server computer may break a composed web page into a set of (key, value) pairs and an associated web template, which are stored in a database accessible to the server computer. In response to a request for the web page, the server computer generates an HTML file using the (key, value) pairs and the web template and transmits the HTML file to a requesting client computer to render a web page that has a look-and-feel substantially similar to that of the web page composed on the client computer, i.e., the web-page content entered on the client computer.

Referring to FIG. 5, in some embodiments, the web-page content is not stored in the form of an HTML file on the web page authoring system 530 (or, more generally, any server, as discussed below with reference to FIG. 12). Instead, the web-page content is decomposed into multiple (key, value) pairs, each key identifying a structured field in the web page and each value corresponding to the web-page content in the structured field. The web page has an associated web template that includes information defining the look-and-feel of the web page.

Upon receipt of a request for a particular web page by a user from one of the clients 510, the server 530 identifies a corresponding set of (key, value) pairs and a web template associated with the web-page content in the storage devices or databases associated with the server 530. The server 530 dynamically generates an HTML file using the identified information and returns the HTML file to one or more of the clients 510. On the client side, the HTML file is rendered into a web page in a web browser window (or more generally, a window on the client system 700 in FIG. 7).

Referring to FIG. 7, the browser-tool module 728 may include instructions for downloading one or more user-requested HTML files from a remote location and rendering the HTML file into a web page on the display 718 of the client computer 700. The received web page may be the authoring web page 730, or other web page.

With the support of the authoring web page 730, a web-page author can directly compose a web page through a browser window using the I/O devices, such as the user interface 714, the keyboard 716 and/or a mouse 717. According to some embodiments, the authoring tool embedded in the authoring web page 730 is a software package written in JavaScript™. The package includes multiple modules, each module responsible for accomplishing one or more designated tasks related to the construction of the web page.

Figure 10:
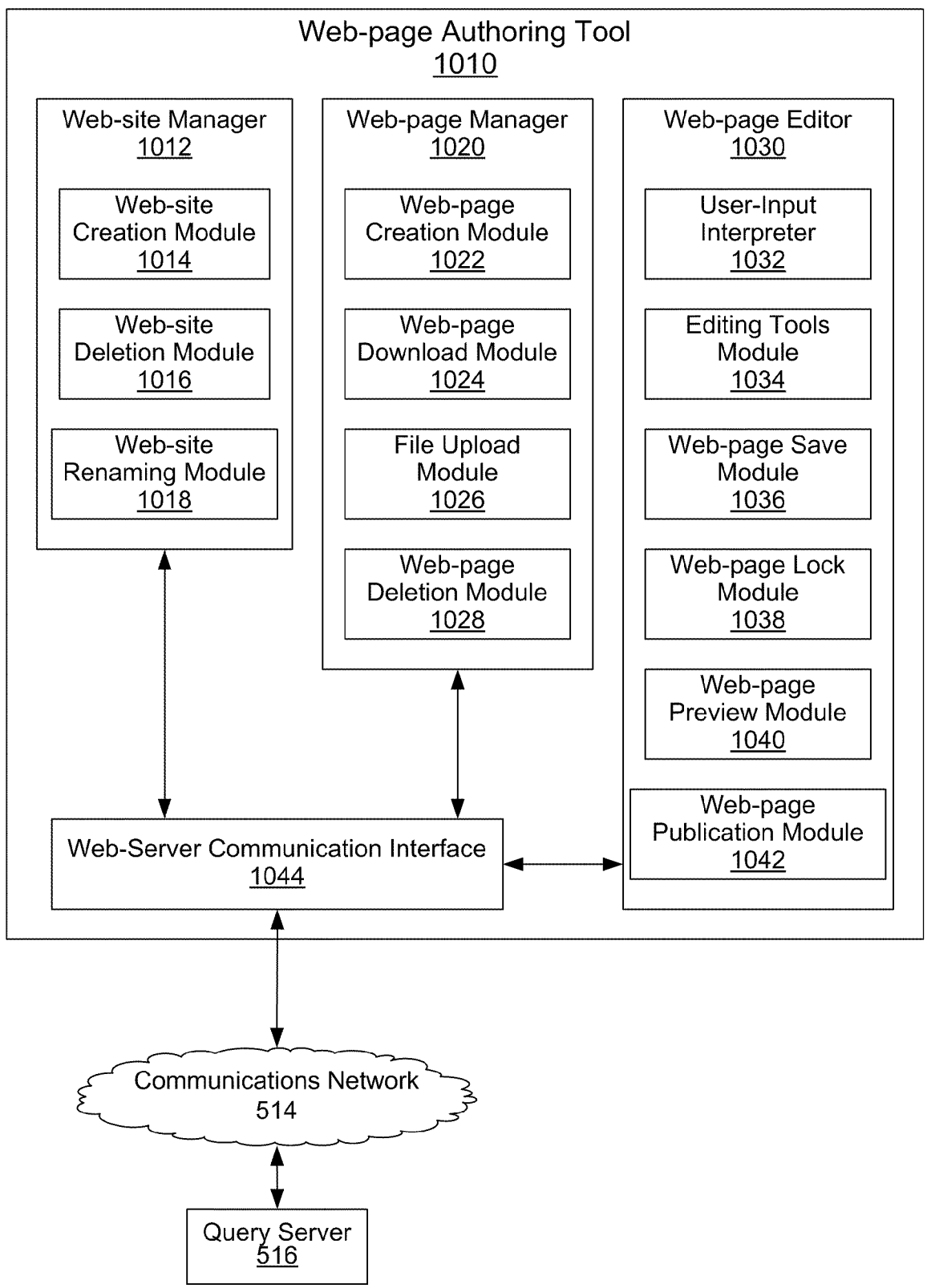
FIG. 10 is a block diagram illustrating an embodiment of a web-page authoring tool.

FIG. 10 is a block diagram illustrating a detailed structure of the web-page authoring tool 1010 according to some embodiments. Based on their respective responsibilities, the modules are partitioned into four groups:

Web-site Manager 1012—The web-site manager performs multiple web-site-specific operations and includes modules like:

Web-site Creation Module 1014—The web-site creation module prompts a user to enter a web-site title and a web-site name. The web-site title characterizes information hosted by the web-site. The web-site name typically contains a unique string of alphanumeric characters. In some embodiments, the web-site manager suggests a web-site name based on the user-provided web-site title.

Web-site Deletion Module 1016—The web-site deletion module prompts a user to confirm whether he would like to remove a web-site and its associated web pages and resources from the server computer's database. In some embodiments, a deleted web-site cannot be recovered.

Web-site Renaming Module 1018—The web-site renaming module allows a web-site's administrator (s) to give the web-site a new name and updates the web-site's record in the database accordingly.

Web-page manager 1020—The web-page manager performs multiple web-page-specific operations and includes modules like:

Web-page Creation Module 1022—The web-page creation module prompts a user to enter a web-page title and, optionally, a uniform resource locator (URL) for a new web page. The web-page title serves as an identifier for the web page in the web-site manager and in the title bar of a browser window. The URL serves as the address of the web page after its publication. In addition, the user may change the automatically generated URL to an appropriate website, Internet or Intranet location.

Web-page Download Module 1024—The web-page download module retrieves a user-requested web page from the server computer and passes it to the web-page editor, which displays the web page in a browser window and makes certain regions in the web page editable.

File upload module 1026—The file upload module prompts a user to enter the address of a file (e.g., an image), verifies that the file has a unique name, and uploads the file to the server computer.

Web-page Deletion Module 1028—The web-page deletion module deletes a user-specified web page from a web site in the server computer. The web page, if not yet published, is deleted. In some embodiments, if the web page has been published, it is deleted when the web site is re-published according to a predetermined schedule, while in other embodiments, the web page is deleted from the website immediately.

Web-page editor 1030—The web-page editor is primarily responsible for creating a WYSIWYG-style editing environment and includes modules like user-input interpreter 1032, editing tools module 1034, web-page save module 1036, web-page lock module 1038, web-page preview module 1040, and web-page publication module 1042, etc. In some embodiments, the WYSIWYG-style editing environment provided by the web page editor is an "in-place" WYSIWYG-style editing environment that enables the user to see the content he or she is entering or changing in the context of the complete composed web page. A more detailed discussion about the web-page editor and its modules is provided below in connection with FIGS. 11A-11J.

Web-Server Communication Interface 1044—The web-server communication interface communicates with a server computer in response to various requests from the web-site manager 1012, the web-page manager 1020, and the web-page editor 1030.

To appreciate how a web-page author composes a web page through a browser window in a WYSIWYG manner, let us look at a hypothetical example. Suppose that there is a cafeteria on a university's campus and the cafeteria's name is "Campus Café". The cafeteria owner updates its menu on a weekly basis. In the past, the owner posted a new weekly menu for the coming week on the front door of the cafeteria every Monday morning. A downside with this advertising strategy is that few people can or will memorize the menu for a week. Therefore, the owner decides to publish the menu on the Internet so that anyone can easily tell what will be served on a particular day by visiting the on-line menu. The owner knows how to use a web browser and has in his mind a rough picture about what the on-line menu should look like. But the owner has no experience with the HTML language. Nor does he have any knowledge about the infrastructure of the Internet.

Assuming that the owner has created a web site for the cafeteria, FIGS. 11A-11J are a set of schematic screenshots illustrating how the cafeteria owner, step by step, composes the on-line menu through a browser window in a WYSIWYG manner.

Figure 11A:
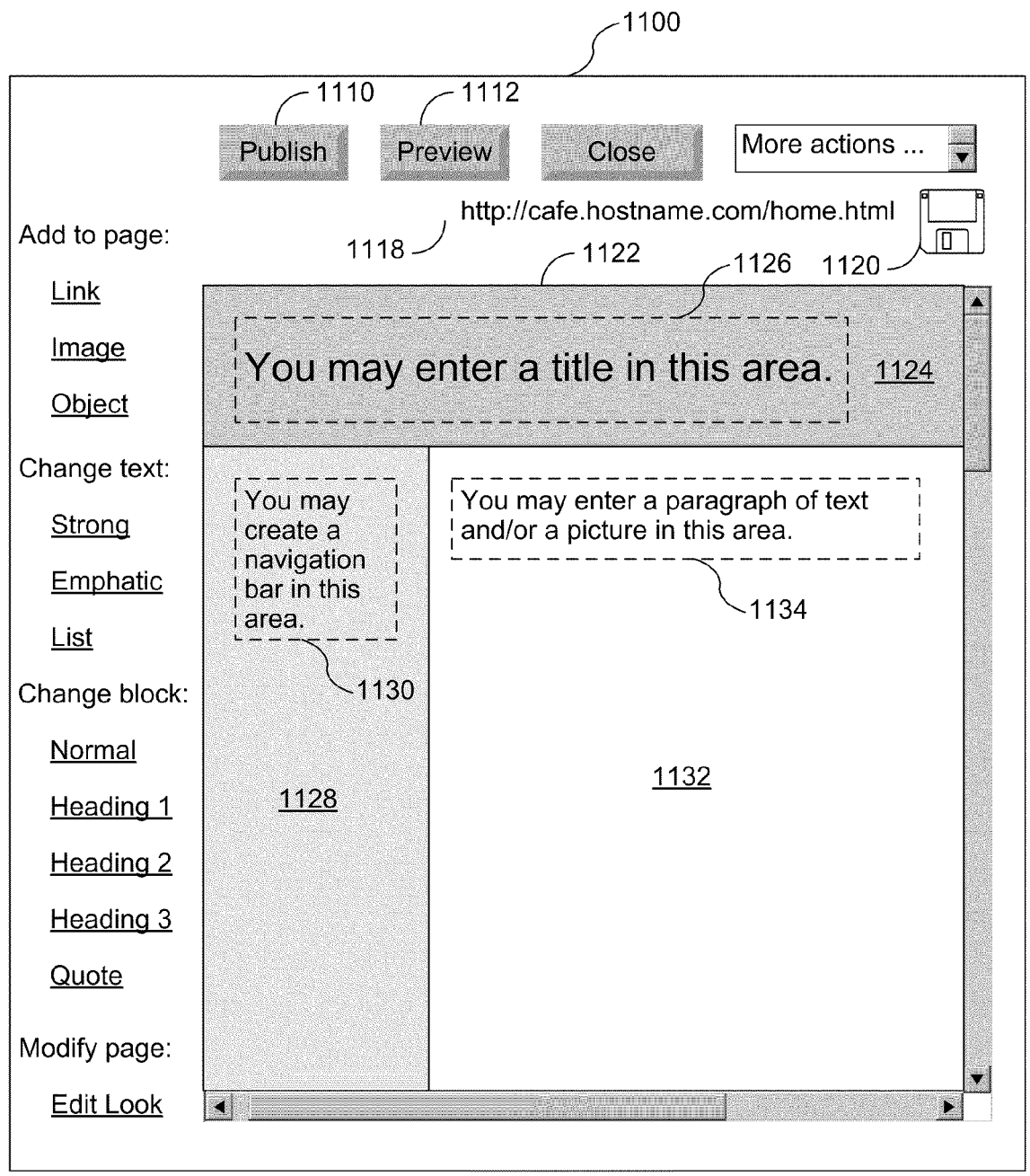

Referring to FIG. 11A, an authoring web page, displayed in a browser window 1100 includes a web-page editing region 1122. The web page editing region 2000 displays a replica of the composed web page, which may be incorporated into the authoring web page through the use of an "iframe" that contains a URL associated with a server 130. The URL in the iframe is used to download from the server HTML corresponding to the composed web page. In other embodiments, the authoring tool or other program on the client may compose the replica, in which case the iframe in the authoring page would contain a URI or URL that points to a locally generated HTML file or object corresponding to the composed web page.

The web-page editing region 1122 includes three content areas 1124, 1128 and 1132, each content area including one or more editing fields. In some embodiments, one or more of the editing fields has a predefined heuristic instruction. The instructions suggest what type of web-page content is recommended for a particular structured field. For example, the content area 1124 includes a title editing field 1126, which provides an instruction "You may enter a title in this area" presented in a large font style typically used by a web-page's title.

Above the web-page editing region 1122 are several web-page editing controls. For example, if the cafeteria owner finishes composing the web page, he may click the "Publish" button 1110 to submit a publication request to the web-page publication module 1042 (FIG. 10) of the web-page editor 1030 (FIG. 10). The web-page publication module 1042 (FIG. 10) transmits the published web page to the server computer, such as the query computer 516 (FIG. 5). The server computer, in response, updates its database components corresponding to the web page. In this example, the server computer makes the newly published on-line menu available to any subsequent user who visits the cyberspace address 1118, http://cafe.hostname.com/home.html, using any suitable browser or similar application. A more detailed discussion about the server-side operations is provided below in connection with FIG. 12.

Every now and then, the owner may pause for a moment and take a brief look at the web page under construction to evaluate if it will have a desired look-and-feel once published. To do so, the owner clicks a "Preview" button 1112. The web-page preview module 1040 (FIG. 10) in response, brings up a preview browser window on the client, displaying the web page in almost exactly the same fashion as if it is published. It is noted that the composed web page replica displayed within the authoring web page also looks very similar to the published web page.

In some embodiments, there may be several minor differences between a published web page and a previewed web page. For example, the previewed web page may include a visual indicator, e.g., an icon or a blinking web-page title, indicating that the web page has not been formally published on the Internet. Any user who visits the URL of the web page still encounters the previously published web page, if any, but not the one displayed in the preview browser window. Moreover, according to some embodiments, previewing a web page does not request assistance from the server computer. The web-page preview module 1040 (FIG. 10) located on the client computer triggers the preview browser window. The HTML file rendered in the preview browser window is the same copy rendered in the web-page editing region 1122.

If the owner decides to close the web-page editing region 1122 without publishing the web page, he may click a "Close" button 1114. In response, the web-page editor 1030 (FIG. 10) closes the browser window 1100, or alternately it replaces the current web page with a "clean" version of the authoring web page that can be used to compose a new web page or to open and revise a user selected web page. In some embodiments, the web-page save module 1036 (FIG. 10) sends a save request including the latest version of the web page to the server computer. The server computer then saves the latest version in its database, such as the web-page content database 540. Next time, when the cafeteria owner is ready to resume editing the composed web page, he may re-open the authoring web page, including the current version of the composed web page, by clicking a hyperlink to the web page in a browser window. The new browser window also contains a web-page editing region receiving user inputs with respect to the web page.

In some embodiments, the web-page save module 1036 (FIG. 10) periodically, e.g., every few seconds, transmits the latest version of the web page to the server computer to avoid losing any user input. A floppy disk icon 1120 in the browser window 1100, through switching its look between two modes (compare FIGS. 11A and 11B), indicates whether the latest user input has been saved into the server-side database. To transmit the latest version, the web-page save module 1036 (FIG. 10) may transmit to the server computer data representing the difference between the current version of the web page and a prior version (e.g., the most recent version saved by the server computer). The size of the update depends on the amount of new user input during the time interval.

Since the communication protocol between a web browser and a web server is stateless, periodic contact between the client computer and the server computer is desired to avoid simultaneous editing efforts from multiple users. This is especially true in the event that the creator of a web page may grant multiple users the right to edit the web page. Therefore, a periodic update initiated by the web-page save module 1036 (FIG. 10) serves as a signal to the server computer that there is an ongoing composing session associated with the web page.

Alternatively, while one user edits a web page through one client computer, the web-page lock module 1038 (FIG. 10) on the client computer periodically pings back to the server computer, indicating that the web page is still being edited, and prohibits other users from editing it. When a second user attempts to edit the web page by, e.g., clicking a hyperlink to the web page, a message appears on his or her computer monitor suggesting that the web page is currently locked by another user and he or she cannot access the web page.

In some embodiments, the server computer allows the second user to break the lock set up by the first user. This mechanism is necessary when a user attempts to edit the web page from one client computer after he forgets to release the web page from another computer which was opened previously. In this scenario, the server computer sends an email message to the user whose lock is broken, the message attaching a copy of the final version of the web page composed by the user so that his work will not be lost.

To the left of the web-page editing region 1122 are a few illustrative tools supported by the editing tools module 1034 (FIG. 10). The cafeteria owner can use them to enrich the content and style of the web page under construction. For example, the owner may upload an image into the web-page editing region 1122 and create a table listing each day's menu items. If the owner is not satisfied with the web page's current look-and-feel, he may click the "Edit Look" link and associate the web page with a different web template. As a result, the web page in the web-page editing region 1122 is re-rendered in accordance with the newly chosen web template. Each web template may associate particular colors, border styles, text styles and the like with each web page region of the web template, and these styles and other characteristics are applied to the structured fields in the respective regions of the web page being composed. The use of fielded editing and logical styles facilitates the transformation between templates.

Figure 11B:
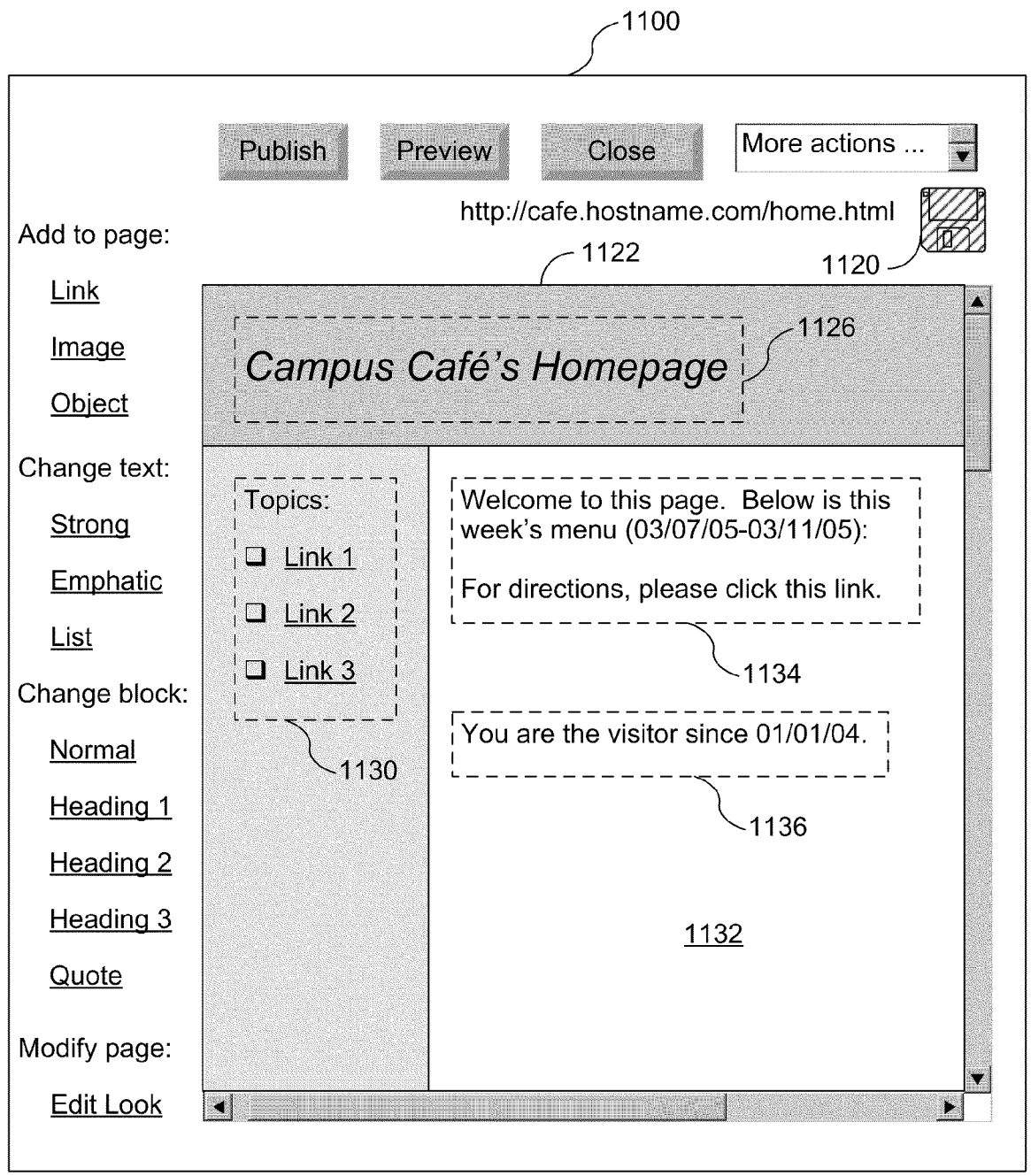

FIG. 11B is a screenshot of the on-line menu after the owner enters certain textual input into different structured fields. In the title editing field 1126, the owner enters the title of the web page, "Campus Café's Homepage". Note that the owner sets the font style of the title to be italic, different from that of the original heuristic instruction in the field. In other words, a web-page author does not have to abide by the heuristic instruction. He can decide the style of the web page arbitrarily to his like. In the navigation bar editing field 1130, the owner creates a set of navigational links, each link referencing a different web page or web site that is presumably of interest to a visitor to the on-line menu. For example, one of the links may point to the web site of the university's newspaper. A visitor to the on-line menu can jump to the newspaper's web site by a single click on the link, learning the topic of the newspaper's recent edition. Alternatively, the cafeteria owner may put several advertising items in this region. The advertising items are tailored in accordance with the characteristics of the visitors to the web page. 1

In the large content editing area 1132, the owner adds a traffic tracking editing field 1136. As discussed in more detail below, to track the traffic to the web page, the owner has to plug a counter object into the field and the counter should be located between the word "the" and "visitor". To do so, the owner can click the "Object" link to the left, which brings up various predefined objects including different styles of counter objects for the owner to choose. In the text editing field 1134, the owner provides a brief introduction to this web page and a message about the direction to the cafeteria. A table is going to be inserted into this field to host the weekly menu (see, e.g., FIG. 11F). For those visitors who are not familiar with the cafeteria's location, a link may be attached to the word "link" at the end of the message in FIG. 11G so that they can seek help from a third-party service provider, e.g., Google Maps.

Note that the floppy disk icon 1120 in FIG. 11B has a different look from the one shown in FIG. 11A. This is because the screenshot is taken right after the owner finishes entering certain input and before the web-page save module 1036 (FIG. 10) has a chance to transmit the input to the server computer. Once the new user input is transferred to and saved on the server side, the floppy disk icon 1120 will resume the look shown in FIG. 11A.

Figure 11C:
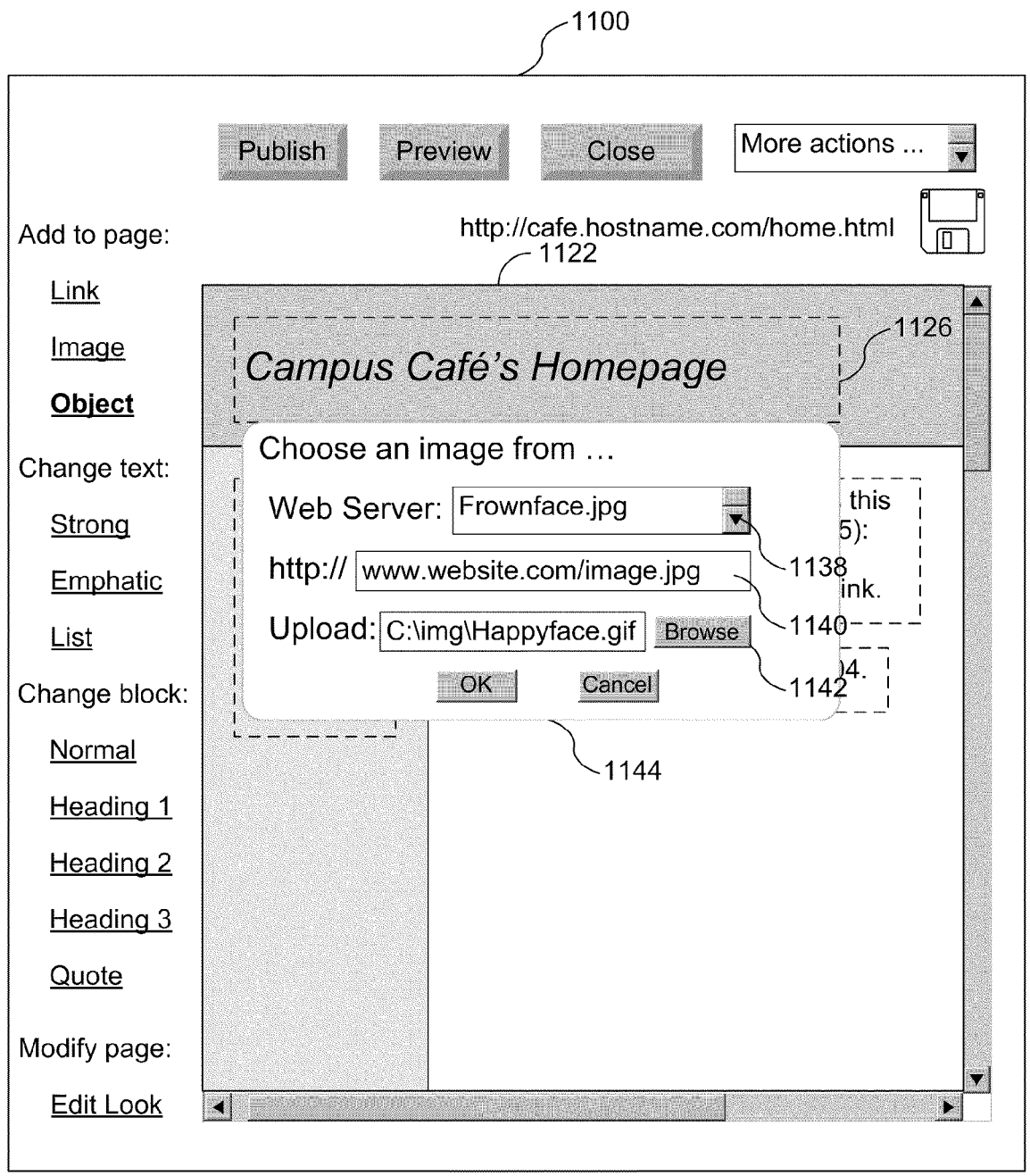

FIG. 11C illustrates how the cafeteria owner adds an image, e.g., the "Happy Face" to the web page, according to some embodiments. To do so, the owner selects the "Image" link to the left, notifying the web-page editor 1030 (FIG. 10) that he is going to add an image to the web page. The web-page editor 1030 (FIG. 10), in response, inserts a user specified image at the location indicated by the user's cursor when the user selects the Image link.

Illustratively, the owner chooses the title editing field 1126 by clicking a mouse button on the right end of the field. The web-page editor 1030 (FIG. 10), in response, highlights the field's boundary by, e.g., making it wider or blinking, indicating that the title editing field is chosen to host the image. The web-page editor 1030 (FIG. 10) brings up an image inserting dialog box 1144 for the owner to identify the source of the image. In this embodiment, the dialog box 1144 lists three potential sources for the image. For example, the owner may have pre-loaded a number of files (including images) into the server computer using the file upload module. He can choose one of them from the dropdown list 1138. Otherwise, the owner may identify the image by entering an image URL in the URL field 1140 or by browsing the file system of the local client computer to specify a file location 1142 of an image file to be uploaded to the server. In some embodiments, the image identified in the fields 1140 or 1142 automatically becomes a new member in the dropdown list 1138 after the image is inserted into the web page.

In the present embodiment, the owner chooses to upload the "Happy Face" image from the local client computer and hits the "OK" button in the image inserting dialog box 1144. As a result, the image appears in the title editing field 1126 at the location within that field previously specified by the owner (by clicking the mouse button while pointing to the location) and the image inserting dialog box 1144 disappears. Note that the owner can cancel the image inserting operation by clicking the "Cancel" button in the dialog box 1144 or by simply going back and re-clicking the "Image" link before clicking the "OK" button.

In some embodiments, if the owner clicks the mouse button at a location outside all existing editing fields, the web-page editor 1030 (FIG. 10) creates a new instance of a structured field surrounding the position where the mouse-button click occurs. The image is loaded into this newly created field in the same manner as discussed above.

Figure 11D:
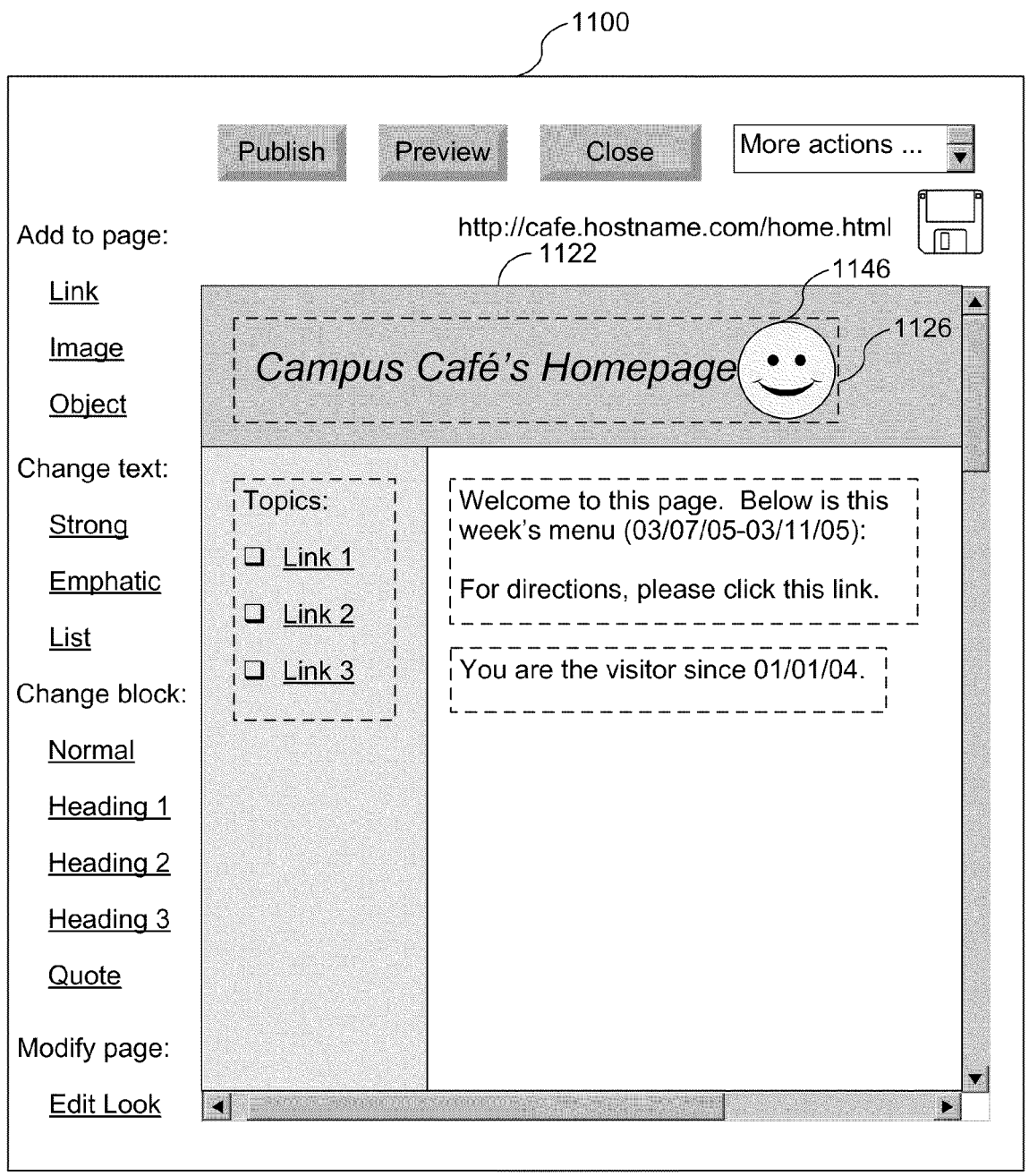

Sometimes, a web-page author may not be satisfied with the initial chosen image location and would like to relocate the image to another location within the same or a different field. FIG. 11D is screenshot illustrating how the web-page editor 1030 (FIG. 10) supports this image relocating operation. For illustrative purposes, the owner now decides to move the "Happy Face" image to the left of the web-page title. In some embodiments, while a replica copy of the image is dragged towards the left by the mouse pointer, the original copy 1146 of the "Happy Face" image remains at its original location in the editing field 1126 to remind the owner of the current web-page style. There is at least one visually distinct feature separating the two copies of the image, e.g., the replica copy may be configured to look more transparent than the original copy 1146.

In some embodiments, an image in a structured field can be in only one of three "position states:" 1) centered as its own paragraph (i.e., it is either above the first paragraph of text in the field, below the last paragraph of text in the field, or between two paragraphs of text); 2) floating left of a paragraph of text (e.g., the top edge of the image is at the same vertical position as the top of a particular paragraph in the field, and the left edge of the image is aligned with what would otherwise be the left margin of the paragraph of text; or 3) floating right of a paragraph (e.g., the top edge of the image is at the same vertical position as the top of a particular paragraph in the field, and the right edge of the image is aligned with what would otherwise be the right margin of the paragraph of text).

When a user selects (e.g., clicks on) an image in a structured field and begins dragging it, the original image remains in place while a second, visually distinguishable version (e.g., a translucent version) of the image becomes draggable. The user can drag the second version of the image around the field freely. The original, opaque version of the image, however, snaps to new locations as the user drags it. In particular, the opaque version of the image snaps to the nearest position that conforms to the above position state rules. When the user stops dragging the image, the last position of the opaque version of the image becomes the new position of the image. Moreover, a user can insert or move multiple images to the same position state (e.g., the first position state) in the same "paragraph." As the user drags an image, the user can reorder it within a "paragraph" that has multiple images. The overall effect of this methodology of moving images is a highly intuitive experience that, while restrictive, generally gives users a desirable outcome for the positions of their images, while making it difficult to produce undesirable outcomes (i.e., web pages that appear badly composed).

Figure 11E:
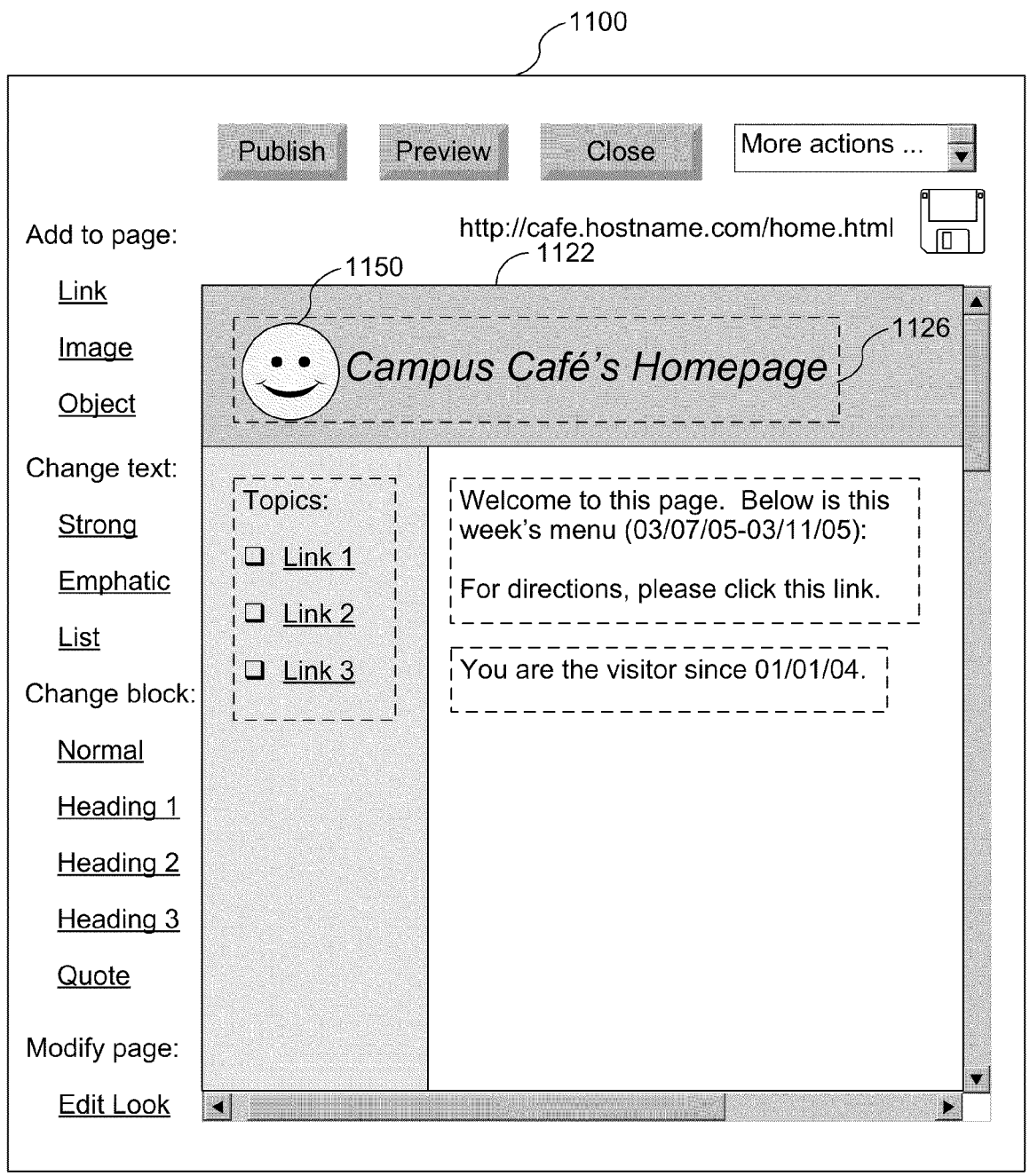

FIG. 11E illustrates how the web page looks like after the owner positions the "Happy Face" image 1150 at the left end of the title editing field 1126. Note that the web-page editor 1030 (FIG. 10) automatically shifts the title in the field to the right to leave sufficient space for the image. In other words, the web-page editor 1030 (FIG. 10) re-adjusts the layout of the remaining content objects in a field, be it a text paragraph or an image or both, in accordance with the movement of a relocated content object (e.g., an image). The owner can move the relocated content object into or out of a structured field or within the same structured field. If the content object moves out of the field, the remaining content objects are relocated accordingly to utilize the space left by removing the content object from the field. If the content object moves into the field, the other content objects are moved to set aside sufficient space for the incoming content object. The user-input interpreter 1032 (FIG. 10), by monitoring movement of the mouse pointer and user keystrokes, enables the human-computer interactive web page composing and editing features and methods described here.

Figure 11F:
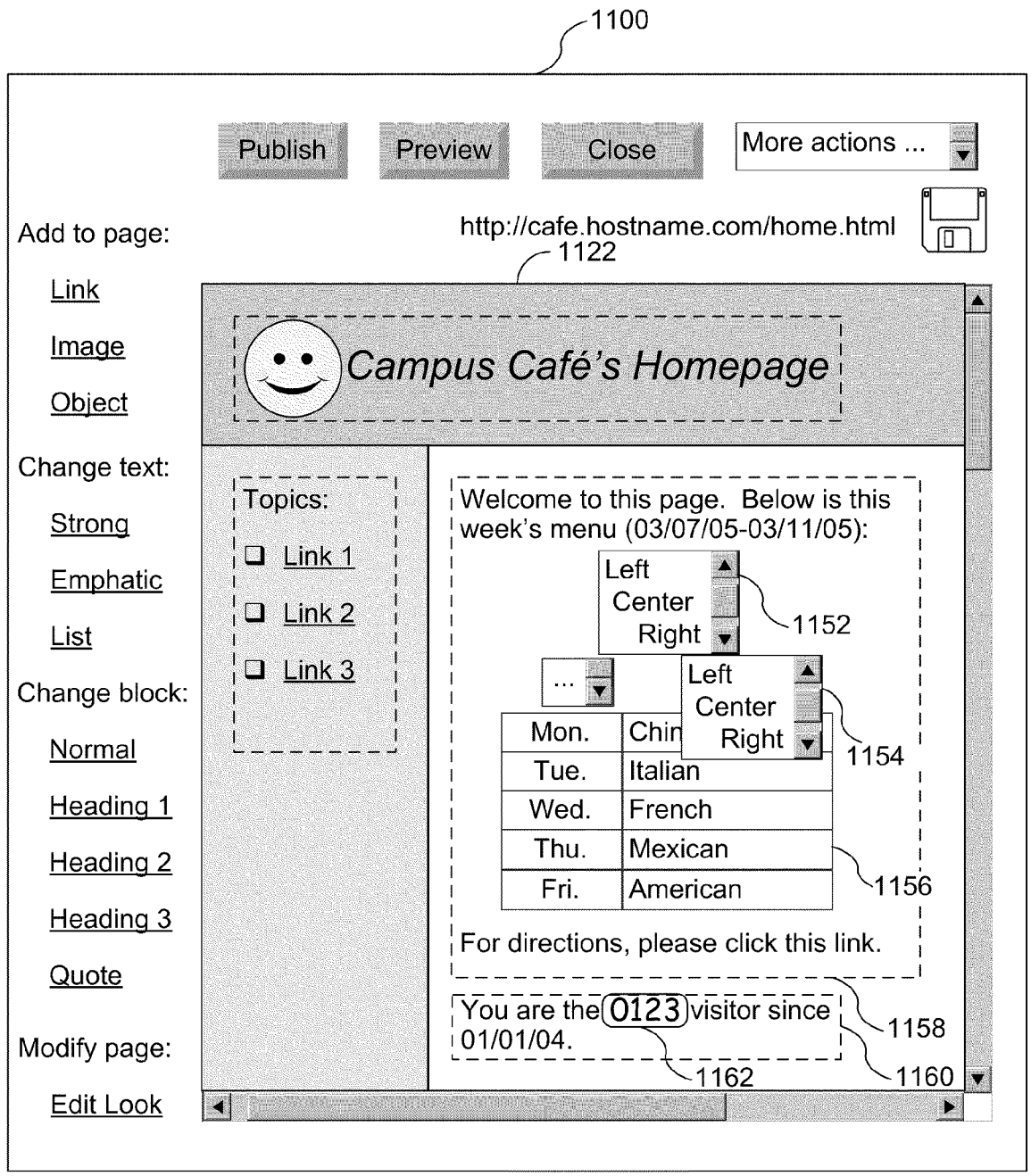

FIG. 11F is a screenshot illustrating the construction of a table in one of the structured fields. In this embodiment, table is a special type of object associated with the "Object" link to the left of the web-page editing region 1122. The cafeteria owner clicks the mouse button on a position within the editing field 1158 where the table is allocated. The web page editor inserts an initial, predefined table at the position indicated by the user's cursor. The user can then remove and insert rows and columns, at user specified locations with respect to the table, using graphical user interface (GUI) tools displayed with the table. Rows and columns can also be reordered using the displayed GUI tools.

In this example, the web-page editor 1030 (FIG. 10) responds to the cafeteria owner's commands by creating a 5-row table 1156 in the middle of the editing field 1158, each row having two columns and hosting the lunch menu served at a particular weekday. Right above the table 1156 are a table-level control dropdown list 1152 and two column-level control dropdown lists 1154, one for each column of the table. The owner chooses a desired table alignment strategy, e.g., center-aligned, in the dropdown list 1152 and the web-page editor 1030 (FIG. 10) adjusts the table 1156 accordingly. Using each column-level control dropdown list 1152, the owner can specify a text alignment strategy for each individual column. In this particular embodiment, the left column is set to be center-aligned and the right column is set to be left-aligned. In some embodiments, the web-page editor 1030 (FIG. 10) may enable a set of row controls for each row of the table. Note that the use of the dropdown list 1152 for table controls is only for illustrative purposes. One skilled in the art may choose a different type of control mechanism to achieve the same or similar results.

In FIG. 11F, a counter object 1162 is plugged into the traffic tracking field 1160. In some embodiments, the counter 1162 is another special type of object that a web-page author can choose by clicking the "Object" link to the left of the web-page editing region 1122. The counter tracks the number of visits to the web page since a particular date.

Figure 11G:
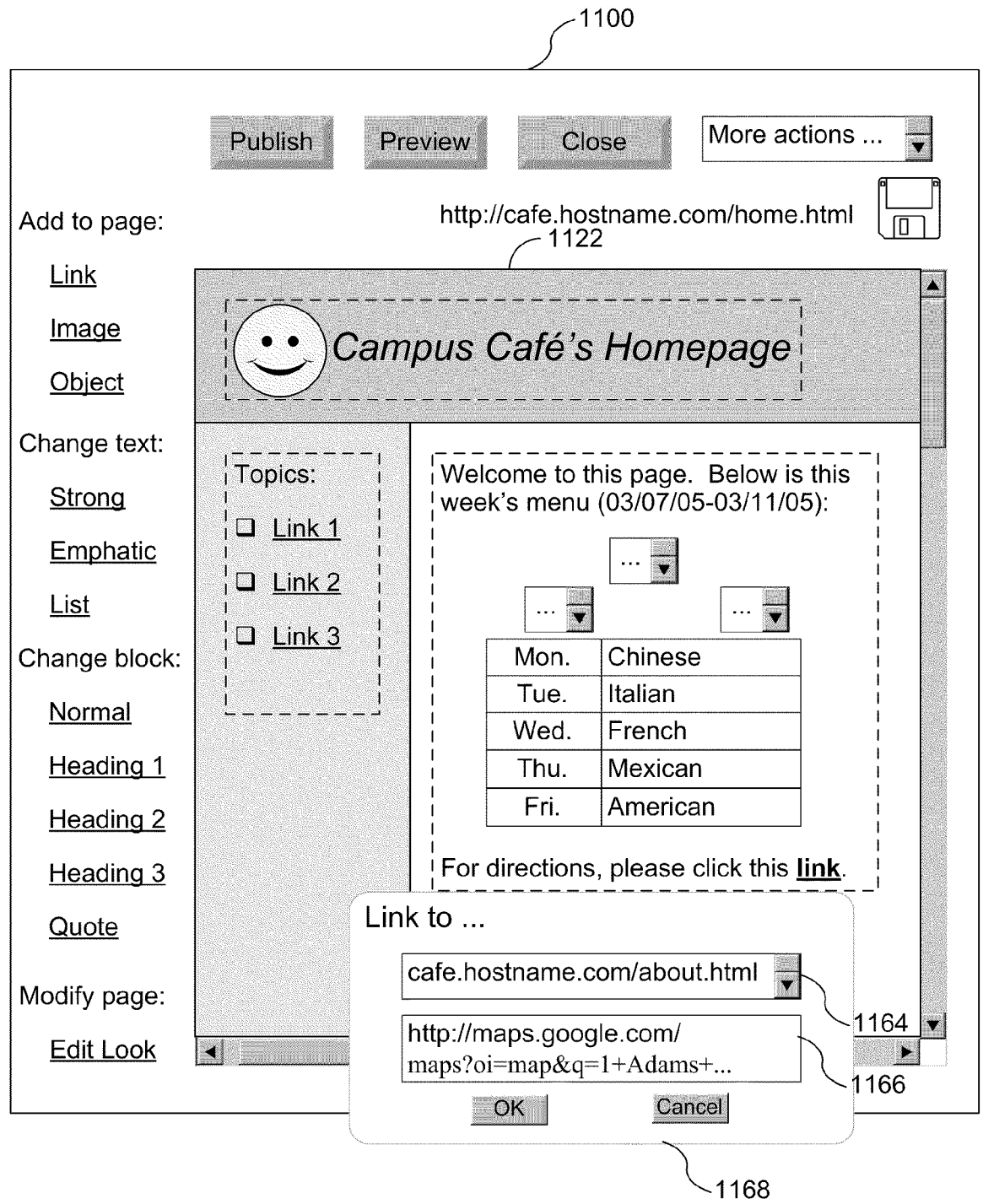

FIG. 11G is a screenshot illustrating how to associate a content object in the web page with a link to another web page or web site. This operation is similar to the operation of inserting an image into the web page. The owner clicks the "Link" link to the left of the web-page editing region 1122 to notify the web-page editor 1030 (FIG. 10) that it should bring up a dialog box. If text is selected when the link command is selected, that text is transformed into a link.

As shown in FIG. 11G, the linking dialog box 1168 pops up near the user-selected content object, the word "link". The linking dialog box 1168 provides two potential sources for the link. The dropdown list 1164 includes other web pages composed by the owner, which may be associated with the web page under construction. For example, the on-line menu web page may be one of many web pages in a personal web site constructed by the cafeteria owner. In this example, the other web pages associated with the web site are listed in the dropdown list 1164. Alternatively, the cafeteria owner may enter a URL (in a second editable box 1166). For instance, the URL entered by the owner in dialog box 1166 may point to another web site or web page that offers a service that the owner deems useful to his on-line menu. In the example shown in FIG. 11G, the owner establishes a link to Google's mapping service, http://maps.google.com/maps?oi=map&q=1+Adams+Street,+Boston,+MA. Using this link, a new customer to the cafeteria is led to a map showing the location of the Campus Café (which, in this example, is the fictional address 1 Adams Street, Boston, Mass.).

Figure 11H:
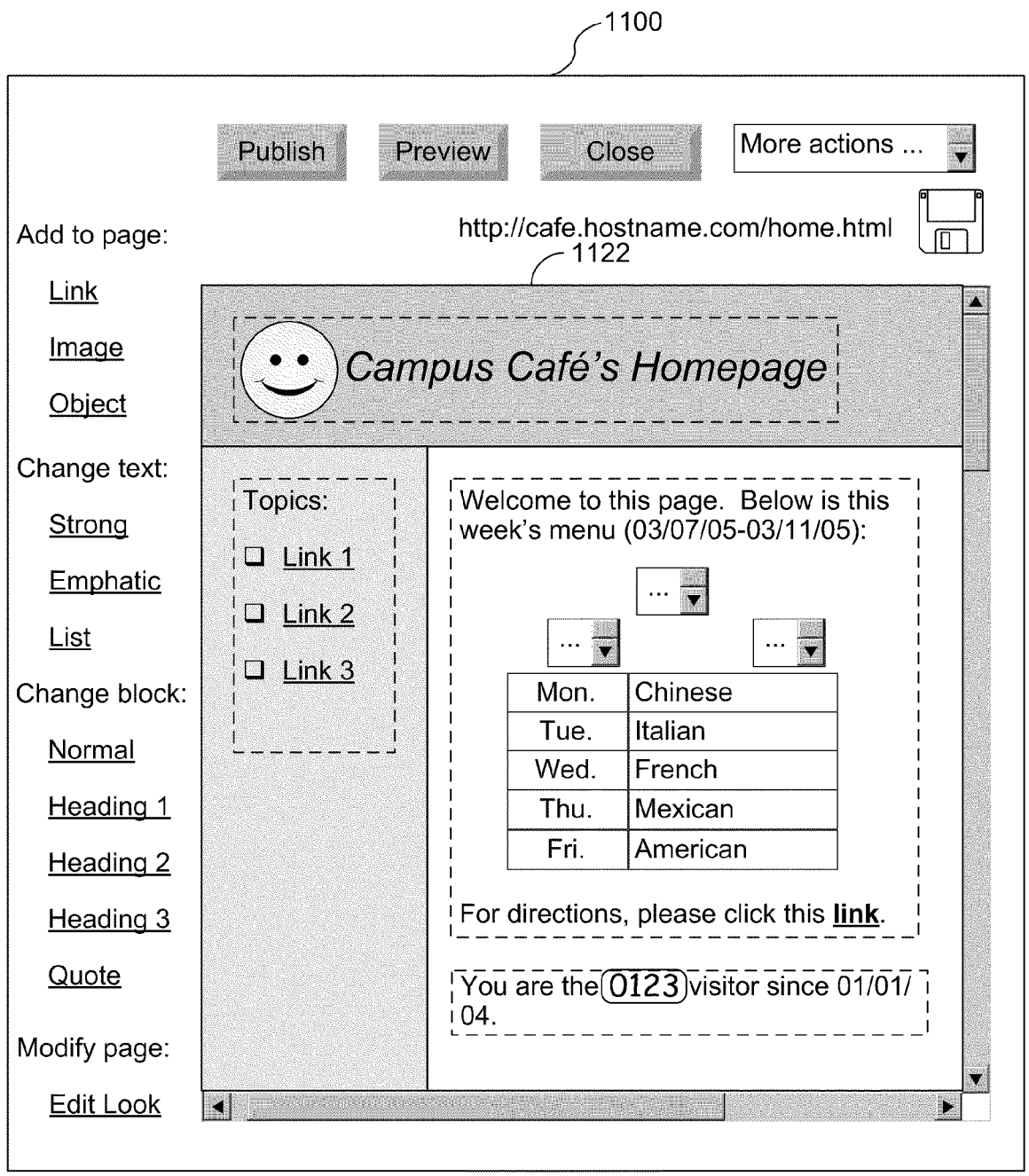

FIG. 11H is a screenshot of the authoring web page right before publication of the newly composed web page on the Internet. FIG. 11I is a screenshot of the same web page rendered in a separate browser window 1170 after its publication. The web page has an almost identical look-and-feel as it had when the corresponding web-page content was displayed in the web-page editing region 1122 in FIG. 11H. The only noticeable difference is that the dashed line boundaries associated with the editing fields and the table control dropdown lists are not shown in the published web page. Other than that, all the content objects in the published web page are rendered in the browser window 1170 in a WYSIWYG manner.

Figure 11J:
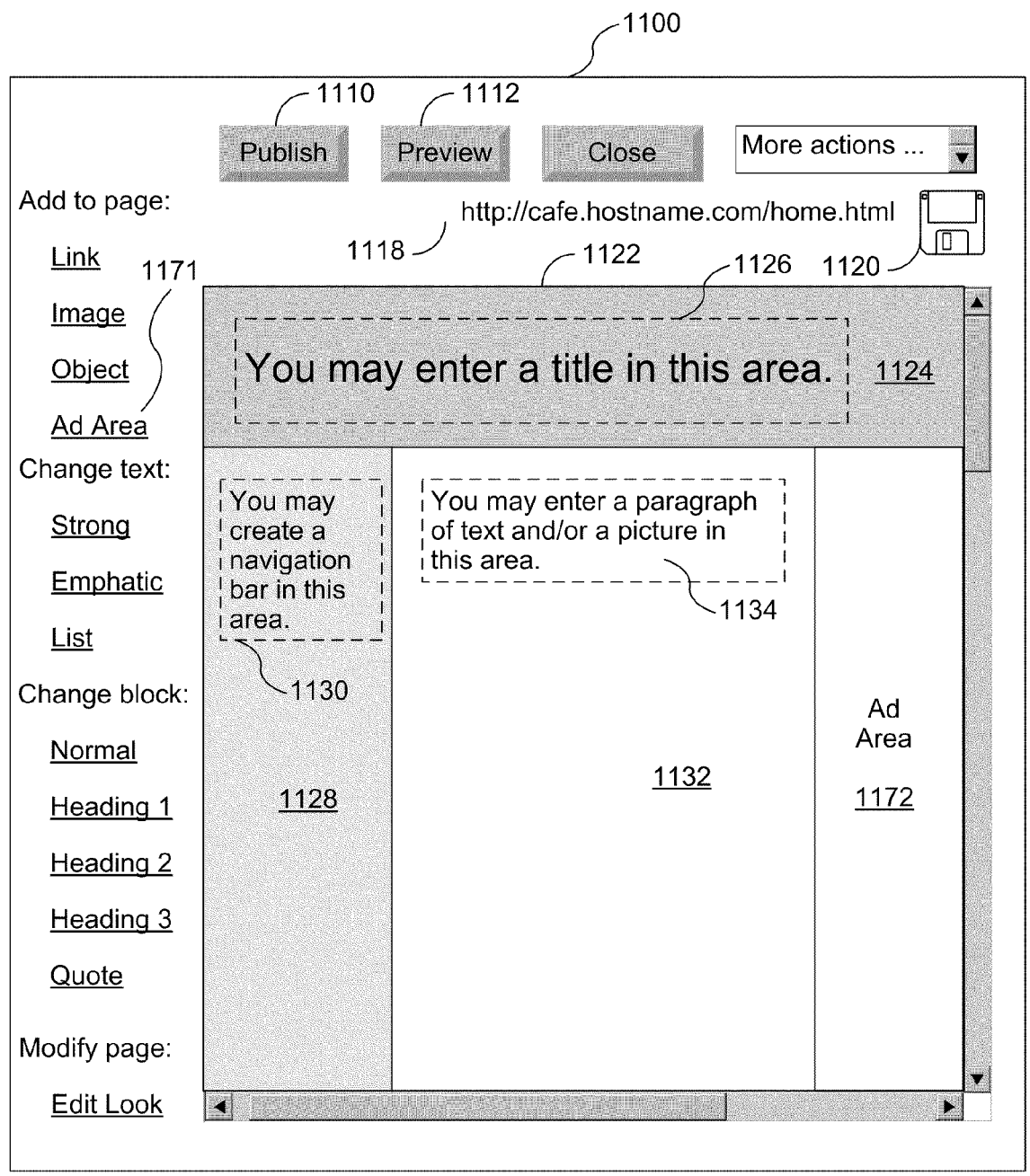

FIG. 11J is a schematic screenshot of an authoring web page, similar to FIG. 11A except that in this embodiment the authoring tool includes a tool or link 1171 for creating an advertisement area 1172, for use in a joint advertising program. In some embodiments, the advertisement area 1172 includes a JavaScript that identifies the web page publisher (typically the owner of the web page), the size of the web page region available for showing advertisements, and so on. The JavaScript "pulls" advertising content into the composed web page from an advertising server when the composed web page is rendered in a browser connected to the Internet or other network that includes the advertising server.

In a client computer, the various content objects of a web page entered by a web-page author typically exist in the form of an HTML file and its associated resource files (e.g., image files), because the web page is rendered from an HTML file.

In the server computer, such as the query server 516 (FIG. 5), as mentioned above, the various content objects of a web page are organized into a set of (key, value) pairs, each key identifying a structured field in the web page and each corresponding value identifying the web-page content appearing in the structured field. In some embodiments, the (key, value) pairs of a web page can also specify characteristics of a field or its content, such as a font or font characteristic (e.g., italic, or bold), or image size, or the like. For instance, font characteristics for content in a field are indicated using HTML tags within the value of the (key, value) pair for that field. Thus, the value in a key-value pair may be or include HTML encoded text. In some embodiments, when the server computer receives one or more key-value pairs for a composed page, the server filters the key-value pairs to remove one or more predefined classes of content. For instance, the server may remove JavaScript or ECMAScript, if any, from the values of the received key-value pairs before those key-value pairs are durably stored. In this example, content is removed from the key-value pairs in order to avoid potential security or privacy breaches. In another example, the server may remove JavaScript or ECMAScript from most key-value pairs, but may allow a restricted set of JavaScript or ECMAScript commands to be included in certain key-value pairs. For instance, the key-value pair for an advertising region may be permitted to include the specific subset of JavaScript commands used to define an advertisement region. Such key-value pairs may be validated to ensure that they contain only allowed JavaScript commands. In other examples, content may be removed from the key-value pairs in order to further other goals or to implement predefined policies.

Besides the (key, value) pairs, the web page has an associated web template that includes information defining the look-and-feel of the web page. In some embodiments, the server computer stores a number of predefined web templates in its storage device, each identified by a unique template ID. Before entering any content into a web-page editing region 1122 (FIG. 11A), the web-page author chooses one of the web templates that he sees fit for the web page. At the end of the web-page construction, the server computer associates a set of (key, value) pairs with a particular template ID referencing the web template chosen by the web-page author. If the web-page author does not like a previously chosen web template, he can replace it with another one using the "Edit Look" link. The web-page author may design his own web template if none of the predefined web templates satisfies his needs.

Figure 12:
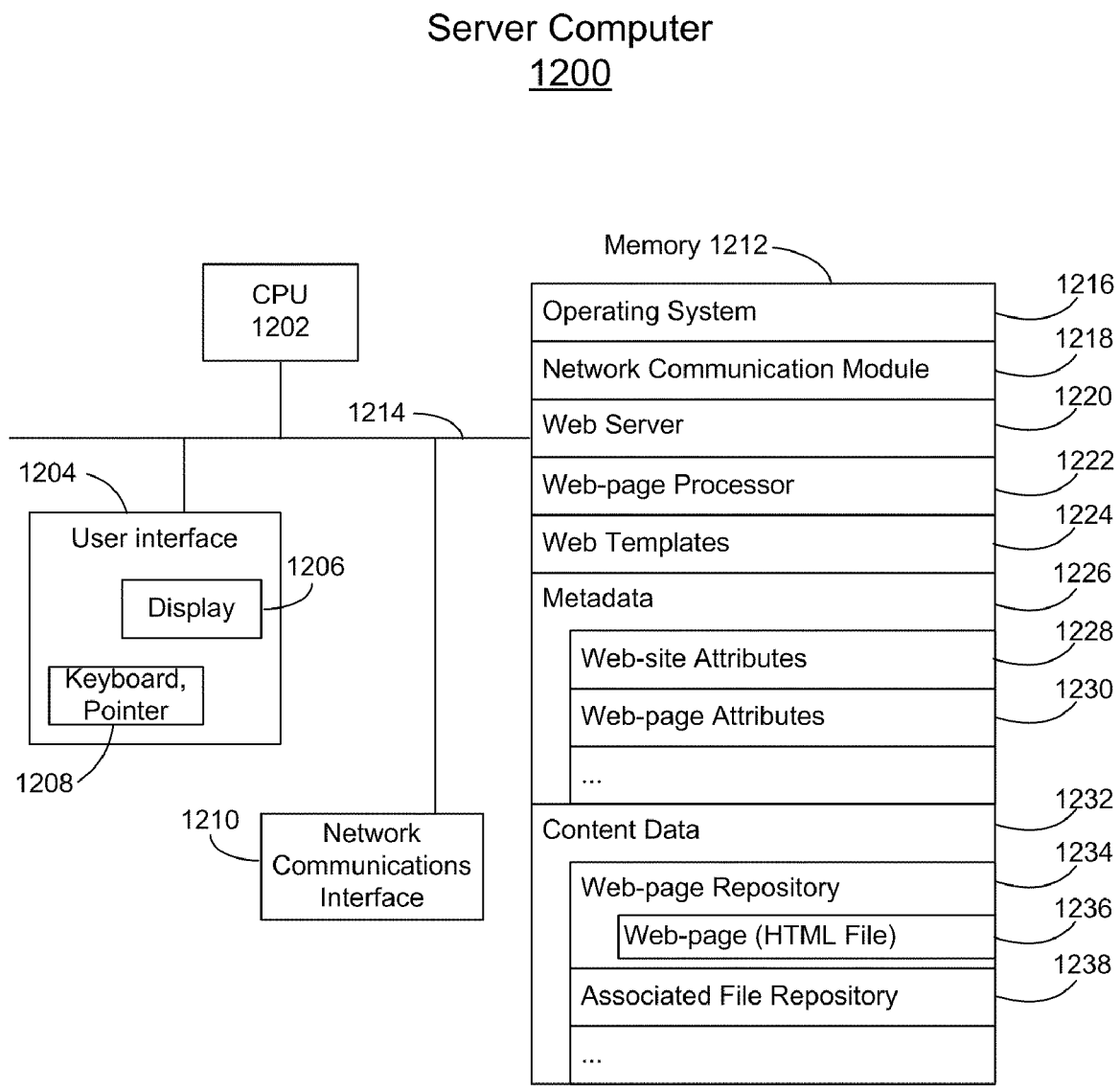
FIG. 12 is a block diagram illustrating an embodiment of a server computer.

FIG. 12 is a block diagram illustrating the structure of another embodiment of a server computer 1200. Like the client computer 700 (FIG. 7), the server computer 1200 also includes one or more processing units (CPUs) 1202, one or more network or other communications interfaces 1210, memory 1212, and one or more communication buses 1214 for interconnecting these components. The server computer 1200 optionally includes a user interface 1204 that comprises a display device 1206 and a keyboard and/or pointer device 1208. The memory 1212 includes high speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1212 may optionally include one or more storage devices remotely located from the CPUs 1202. Memory 1212, or alternately the non-volatile memory device(s) within memory 1212, comprises a computer readable storage medium. In some embodiments, the memory 1212, or the computer readable storage medium of memory 1212 stores the following elements, modules and data structures, or a subset or superset thereof:

- an operating system 1216 that includes procedures for handling various basic system services and for performing hardware dependent tasks;
- a network communication module (or instructions) 1218 for connecting the server computer 1200 to other computers via the one or more network communications interfaces 1210 (through wired or wireless connections), using the Internet, other wide area networks, local area networks, metropolitan area networks, or the like;
- a web-server module (or instructions) 1220 for handling user access requests for web pages from different client computers, including receiving a user's access request for a web page, verifying the existence of the web page and the user's access privilege to the web page, identifying or dynamically generating an HTML file corresponding to the web page and transmitting the HTML file to a requesting client computer;

a web-page processor module (or instructions) 1222 for dynamically generating an HTML file 1240 corresponding to a user-requested web page using its associated set of (key, value) pairs and web template;

one or more system-defined or user-defined web templates 1224, each web template corresponding to a specific look-and-feel design for a web page;

metadata 1226, the metadata further including one or more web-site attributes 1228, one or more web-page attributes 1230, etc.; and content data 1232, the content data 1232 further including a web-page repository 1234 hosting a plurality of web pages 1236 and an associated file repository 1238 hosting files (e.g., images) referenced by the web pages.

Figure 13:
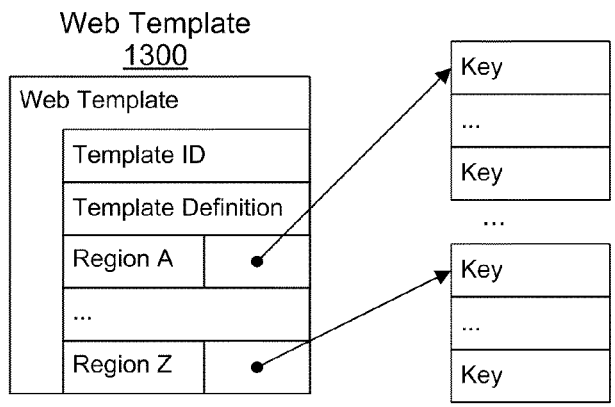
FIG. 13 is a block diagram illustrating an embodiment of a data structure for a web template.
Figure 14:
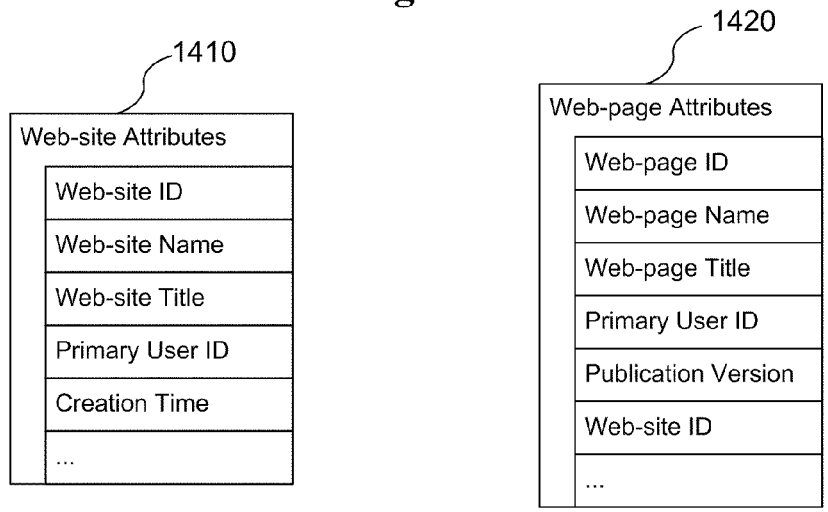
FIG. 14 is a block diagram illustrating an embodiment of data structures including typical attributes used for characterizing a web site and a web page, respectively.
Figure 15:
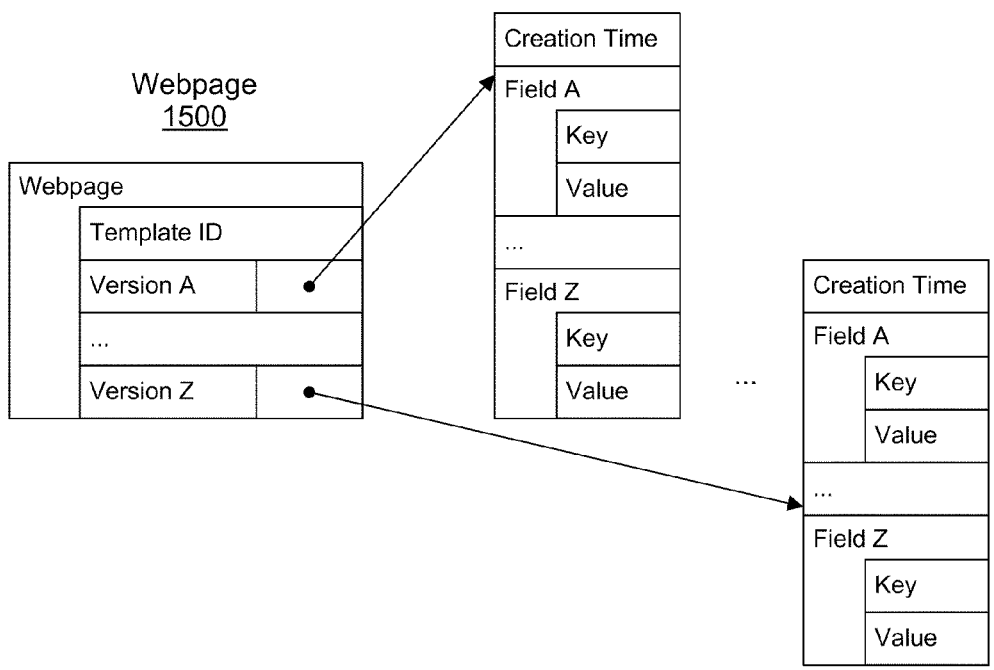
FIG. 15 is a block diagram illustrating an embodiment of a data structure for a web page.

FIGS. 13-15 are block diagrams illustrating data structures used for hosting the various types of data mentioned above in accordance with some embodiments of the present invention.

FIG. 13 is a block diagram illustrating the data structure of a web template 1300. The web template includes a template ID that uniquely identifies the web template and a template definition that partitions a browser window into a plurality of regions, each region corresponding to zero or more keys. The keys are assigned to a specific location in specific region of the web template. When the web template is referenced by a particular web page, corresponding values are inserted into different regions and the web template is converted into a web page. It may be noted that keys associated with the template regions are also associated with the structured fields inserted into these template regions when reconstructing the web pages.

As mentioned above, a web site typically includes many web pages, each one covering a specific topic related to the web site. FIG. 14 shows a data structure 1410 illustrating typical attributes used for characterizing a web site. These attributes include:

web-site ID, which uniquely identifies the web site within the server computer;

web-site name, which can be a user-provided character string defining the web-site's URL;

web-site title, which can be a user-provided character string indicating the general topic of the web-site;

primary user ID, which identifies a web-page author who is primarily responsible for authoring the web pages associated with the web-site, e.g., the creator of the web-site; and creation time of the web-site.

Each web-site includes one or more web pages. To uniquely identify a web page associated with a web-site, the web page is assigned a set of web-page attributes 1420 such as:

web-page ID, which uniquely identifies the web page within a web-site;

web-page name, which can be a user-provided character string defining the web page's URL;

web-page title, which can be a user-provided character string indicating the topic of the web page;

primary user ID, which identifies a web-page author who is primarily responsible for authoring the web page;

publication version, which identifies the version of the web page that has been released to the public or a designated group of visitors; and web-site ID, which identifies the web-site with which the web page is associated.

In some embodiments, the server computer 1200 (FIG. 12) maintains multiple versions of a web page that have been composed at different dates. One benefit inherent in this storage strategy is that a web-page author is able to refer to an old version for reference purposes while composing a new version. This storage strategy also allows the web-page or web-site's owner or administrator to specify that the published version of the web page is a version other than the latest version composed (or in the process of being composed) by the web-page author. In one embodiment, the server computer maintains every version of a composed web page, using delta compression (also called differential encoding) or other techniques to efficiently represent the differences between versions and to enable the reconstruction of any selected version in a sequence of versions of the composed web page.

When the web-page processor 1222 (FIG. 12) receives a request for a web page, it identifies its publication version in the set of web-page attributes 1420 and then retrieves from a server-side database a set of (key, value) pairs corresponding to the publication version and an associated web template. Using this retrieved information, the web-page processor 1222 (FIG. 12) dynamically generates an HTML file for the requested web page and passes the HTML file to the web server 1220. The HTML file is then transmitted back to a client computer and rendered therein. In some embodiments, since the requested version is the published version, the web-page processor 1222 (FIG. 12) does not examine the privilege of the requesting user to determine whether to transmit the web-page authoring tool to the client computer. In some embodiments, the HTML file is transmitted to the requesting user as it is generated by the web page processor 1222, and the web server 1220 does not store a copy of the HTML file. However, in some such embodiments, the HTML files for web pages that have high request rates may be stored in a cache in order to avoid reconstructing those web pages having high request rates. A web page having a high request rate may be defined as a web page having more than a threshold number of requests per predefined time period, or having an average number of requests per predefined time period that exceeds a particular threshold.

FIG. 15 is a block diagram illustrating the data structure of a web page 1500. The web page includes a template ID that uniquely identifies the web template that specifies the web-page's look-and-feel. Note that the web page includes multiple versions, each version corresponding to a set of (key, value) pairs created at a particular date. The web-page author can arbitrarily specify any one of the multiple versions to be the publication version and update the web-page attributes 1420 (FIG. 14) accordingly. FIG. 15 is a conceptual diagram. In one embodiment, the actual data stored for successive versions is compressed, for instance using delta compression, so that the system stores the differences between versions instead of complete copies of each version of the web page.

Each of the above identified modules or programs corresponds to a set of instructions for performing one or more functions described above. These modules and programs (i.e., sets of instructions) need not be implemented as separate software programs, procedures or modules, and thus various subsets of these modules may be combined or otherwise re-arranged in various embodiments. In some embodiments, the memory may store a subset of the modules and data structures identified above. Furthermore, the memory may store additional modules and data structures not described above.

In practice, and as recognized by those of ordinary skill in the art, items shown separately could be combined and some items could be separated. For example, some items shown separately in FIG. 12 could be implemented on single servers and single items could be implemented by one or more servers. The actual number of servers used to implement an email server system and how features are allocated among them will vary from one implementation to another, and may depend in part on the amount of data traffic that the system must handle during peak usage periods as well as during average usage periods.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of composing a web page, comprising:
   at a server,
      transmitting an authoring web page including an embedded authoring tool to a client computer of a publisher of the web page using a network, the authoring tool for composing the web page; and
      receiving from the client computer web-page content corresponding to the composed web page,
   wherein the composed web page includes one or more advertisement regions that are placeholders designated for displaying one or more advertisements having one or more links to one or more content locations; and
   wherein the composed web page is configured for display at run-time at respective clients devices that download the composed web page from a web page server.

2. The method of claim 1, wherein the authoring tool includes instructions for placing one or more instances of predefined structured fields in the composed web page, and for placing field content within the one or more instances of the predefined structured fields.

3. The method of claim 2, wherein the authoring tool includes instructions for modifying the authoring web page to include a replica of the composed web page.

4. The method of claim 1, wherein the advertisements are based on run-time content of the composed web page.

5. The method of claim 1, wherein the advertisements are based on context terms, provided by the publisher of the composed web page, that summarize the web-page content.

6. The method of claim 1, further comprising providing a financial incentive to the publisher of the composed web page in accordance with activation of one of the links associated with the one or more advertisements by a user of a client device that has downloaded the composed web page.

7. The method of claim 6, further comprising receiving financial information from the publisher.

8. The method of claim 7, wherein the financial information includes a name, an address, a telephone number and a social security number.

9. The method of claim 1, further comprising creating an account for the publisher of the composed web page.

10. The method of claim 1, further comprising accessing an existing account for the publisher of the composed web page.

11. The method of claim 1, wherein the web-page content includes one or more instances of predefined structured fields in the composed web page and associated field content within the one or more instances of the predefined structured fields.

12. The method of claim 1, further comprising responding to a request for the composed web page by dynamically generating hypertext markup language (HTML) using the web-page content.

13. The method of claim 1, further comprising receiving a latest version of the web-page content a plurality of times, wherein the plurality of times are separated by at least a minimum predefined time interval.

14. The method of claim 1, wherein the authoring tool comprises instructions selected from the group consisting of JavaScript instructions, ECMAScript instructions and VBScript instructions.

15. The method of claim 1, wherein the authoring web page is transmitted to the client computer in response to a URL invoked at the client computer, the URL including a predefined parameter that instructs the server to automatically include an advertisement region in the composed web page, the automatically included advertisement region comprising one of the one or more advertisement regions that are placeholders designated for displaying one or more advertisements having one or more links to one or more content locations.

16. The method of claim 15, wherein the automatically included advertisement region is configured to include one or more parameters that identify the publisher of the composed web page.

17. The method of claim 1, wherein the authoring web page includes a user-selectable tool for adding an advertisement region to the composed web page, the added advertisement region comprising one of the one or more advertisement regions that are placeholders designated for displaying one or more advertisements having one or more links to one or more content locations.

18. The method of claim 1, wherein a respective advertisement region of the one or more advertisement regions is defined by a script in the composed web page that identifies the publisher of the composed web page.

19. The method of claim 18, wherein the script identifies a size of the respective advertisement region.

20. A non-transitory computer readable storage medium storing one or more programs, for composing a web page, for execution by one or more processors on a server, the one or more programs comprising:
   instructions, which, when executed, transmit an authoring web page including an embedded authoring tool to a client computer of a publisher of the web page using a network, the authoring tool for composing the web page; and
   instructions, which, when executed, receive from the client computer web-page content corresponding to the composed web page,
   wherein the composed web page includes one or more advertisement regions that are placeholders designated for displaying one or more advertisements having one or more links to one or more content locations; and
   wherein the composed web page is configured for display at run-time at respective clients devices that download the composed web page from a web page server.

21. The non-transitory computer readable storage medium of claim 20, wherein the authoring tool includes instructions, which, when executed, place one or more instances of predefined structured fields in the composed web page, and place field content within the one or more instances of the predefined structured fields.

22. The non-transitory computer readable storage medium of claim 21, wherein the authoring tool includes instructions for modifying the authoring web page to include a replica of the composed web page.

23. The non-transitory readable storage medium of claim 20, wherein the advertisements are based on context terms, provided by the publisher of the composed web page, that summarize the web-page content.

24. The non-transitory readable storage medium of claim 20, further comprising instructions, which, when executed, create an account for the publisher of the composed web page.

25. The non-transitory readable storage medium of claim 20, wherein the web-page content includes one or more instances of predefined structured fields in the composed web page and associated field content within the one or more instances of the predefined structured fields.

26. The non-transitory computer readable storage medium of claim 20, wherein the advertisements are based on run-time content of the composed web page.

27. The non-transitory computer readable storage medium of claim 26, further comprising instructions, which, when executed, receive financial information from the publisher.

28. The non-transitory computer readable storage medium of claim 27, wherein the financial information includes a name, an address, a telephone number and a social security number.

29. The non-transitory computer readable storage medium of claim 20, further comprising instructions, which, when executed, provide a financial incentive to the publisher of the composed web page in accordance with activation of one of the links associated with the one or more advertisements by a user of a client device that has downloaded the composed web page.

30. The non-transitory computer readable storage medium of claim 20, further comprising instructions which, when executed, access an existing account for the publisher of the composed web page.

31. A server computer system, comprising:
memory;
one or more processors; and
a program for composing a web page, wherein the program is stored in the memory for execution by the one or more processors, the program including:
instructions, which, when executed, transmit an authoring web page including an embedded authoring tool to a client computer of a publisher of the web page using a network, the authoring tool for composing the web page; and
instructions, which, when executed, receive from the client computer web-page content corresponding to the composed web page,
wherein the composed web page includes one or more advertisement regions that are placeholders designated for displaying one or more advertisements having one or more links to one or more content locations; and
wherein the composed web page is configured for display at run-time at respective clients devices that download the composed web page from a web page server.

32. The server computer system of claim 31, wherein the authoring tool includes instructions, which, when executed, place one or more instances of predefined structured fields in the composed web page, and place field content within the one or more instances of the predefined structured fields.

33. The server computer system of claim 32, wherein the authoring tool includes instructions for modifying the authoring web page to include a replica of the composed web page.

34. The server computer system of claim 31, wherein the advertisements are based on context terms, provided by the publisher of the composed web page, that summarize the web-page content.

35. The server computer system of claim 31, further comprising instructions, which, when executed, create an account for the publisher of the composed web page.

36. The server computer system of claim 31, wherein the web-page content includes one or more instances of predefined structured fields in the composed web page and associated field content within the one or more instances of the predefined structured fields.

37. The non-transitory computer readable storage medium of claim 20, further comprising instructions, which, when executed, respond to a request for the composed web page by dynamically generating hypertext markup language (HTML) using the web-page content.

38. The non-transitory computer readable storage medium of claim 20, further comprising instructions, which, when executed, receive a latest version of the web-page content a plurality of times, wherein the plurality of times are separated by at least a minimum predefined time interval.

39. The non-transitory computer readable storage medium of claim 20, wherein the authoring tool comprises instructions selected from the group consisting of JavaScript instructions, ECMAScript instructions and VBScript instructions.

40. The non-transitory computer readable storage medium of claim 20, wherein the authoring web page includes a user-selectable tool for adding an advertisement region to the composed web page, the added advertisement region comprising one of the one or more advertisement regions that are placeholders designated for displaying one or more advertisements having one or more links to one or more content locations.

41. The non-transitory computer readable storage medium of claim 20, wherein a respective advertisement region of the one or more advertisement regions is defined by a script in the composed web page that identifies the publisher of the composed web page.

42. The non-transitory computer readable storage medium of claim 41, wherein the script identifies a size of the respective advertisement region.

43. The server computer system of claim 31, wherein the advertisements are based on run-time content of the composed web page.

44. The server computer system of claim 31, further comprising instructions, which, when executed, provide a financial incentive to the publisher of the composed web page in accordance with activation of one of the links associated with the one or more advertisements by a user of a client device that has downloaded the composed web page.

45. The server computer system of claim 44, further comprising instructions, which, when executed, receive financial information from the publisher.

46. The server computer system of claim 45, wherein the financial information includes a name, an address, a telephone number and a social security number.

47. The server computer system of claim 31, further comprising instructions which, when executed, access an existing account for the publisher of the composed web page.

48. The server computer system of claim 31, further comprising instructions, which, when executed, respond to a request for the composed web page by dynamically generating hypertext markup language (HTML) using the web-page content.

49. The server computer system of claim 31, further comprising instructions, which, when executed, receive a latest version of the web-page content a plurality of times, wherein the plurality of times are separated by at least a minimum predefined time interval.

50. The server computer system of claim 31, wherein the authoring tool comprises instructions selected from the group consisting of JavaScript instructions, ECMAScript instructions and VBScript instructions.

51. The server computer system of claim 31, the authoring web page includes a user-selectable tool for adding an advertisement region to the composed web page, the added advertisement region comprising one of the one or more advertisement regions that are placeholders designated for displaying one or more advertisements having one or more links to one or more content locations.

52. The server computer system of claim 31, wherein a respective advertisement region of the one or more advertisement regions is defined by a script in the composed web page that identifies the publisher of the composed web page.

53. The server computer system of claim 52, wherein the script identifies a size of the respective advertisement region.

54. A method of composing a web page, comprising:
   at a client of a publisher of the web page,
   receiving from a server a data stream including an authoring web page having an embedded authoring tool using a network, the authoring tool for composing the web page; and
   transmitting to the server web-page content corresponding to the composed web page,
   wherein the composed web page includes one or more advertisement regions that are placeholders designated for displaying one or more advertisements having one or more links to one or more content locations; and
   wherein the composed web page is configured for display at run-time at respective clients devices that download the composed web page from a web page server.

55. The method of claim 54, wherein the authoring tool includes instructions for placing one or more instances of predefined structured fields in the composed web page, and place field content within the one or more instances of the predefined structured fields.

56. The method of claim 54, wherein the advertisements are based on context terms, provided by the publisher of the composed web page, that summarize the web-page content.

57. The method of claim 54, wherein the web-page content includes one or more instances of predefined structured fields in the composed web page and associated field content within the one or more instances of the predefined structured fields.

* * * * *